United States Patent
Park et al.

(10) Patent No.: US 10,666,983 B2
(45) Date of Patent: *May 26, 2020

(54) METHOD AND APPARATUS FOR ENCODING/DECODING IMAGE INFORMATION

(71) Applicant: LG ELECTRONICS INC., Seoul (KR)

(72) Inventors: Seungwook Park, Seoul (KR); Jaehyun Lim, Seoul (KR); Yongjoon Jeon, Seoul (KR); Chulkeun Kim, Seoul (KR); Jungsun Kim, Seoul (KR); Naeri Park, Seoul (KR); Hendry Hendry, Seoul (KR); Byeongmoon Jeon, Seoul (KR); Joonyoung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/387,251

(22) Filed: Apr. 17, 2019

(65) Prior Publication Data

US 2019/0246145 A1 Aug. 8, 2019

Related U.S. Application Data

(63) Continuation of application No. 15/962,939, filed on Apr. 25, 2018, now Pat. No. 10,298,962, which is a (Continued)

(51) Int. Cl.
*H04N 19/86* (2014.01)
*H04N 19/159* (2014.01)
(Continued)

(52) U.S. Cl.
CPC .......... *H04N 19/86* (2014.11); *H04N 19/117* (2014.11); *H04N 19/134* (2014.11);
(Continued)

(58) Field of Classification Search
CPC .. H04N 7/26888; H04N 7/50; H04N 7/26244; H04N 7/30; G06T 5/001
See application file for complete search history.

(56) References Cited

U.S. PATENT DOCUMENTS 6,931,063 B2  8/2005  Sun
7,352,812 B2  4/2008  Sun
(Continued)

FOREIGN PATENT DOCUMENTS

CN  1812580 A  8/2006
CN  101449476 A  6/2009
(Continued)

OTHER PUBLICATIONS

Shijun Sun et al: "Improved TML Loop Filter with Lower Complexity", 14 VCEG Meeting, pp. 1-8, Sep. 20, 2001; XP030003269.
(Continued)

*Primary Examiner* — Shawn S An
(74) *Attorney, Agent, or Firm* — Dentons US LLP

(57) ABSTRACT

The present invention relates to a deblocking filtering method, a method for inducing bs (boundary strength) therefor, and a method and an apparatus for encoding/decoding using the same. The method for inducing the bS of the present invention comprises the steps of: inducing a boundary of a deblocking filtering unit block as a unit block for applying the deblocking filtering; and setting the bS according to each bS setting unit block within the deblocking filtering unit block, wherein the bS setting step can set
(Continued)

▨ bS DECISION IS PERFORMED
▧ bS DECISION IS NOT PERFORMED a bS value for a target boundary corresponding to a boundary of the deblocking filtering unit block as the bs setting unit block.

20 Claims, 18 Drawing Sheets

Related U.S. Application Data continuation of application No. 14/615,771, filed on Feb. 6, 2015, now Pat. No. 9,986,263, which is a continuation of application No. 14/220,753, filed on Mar. 20, 2014, now Pat. No. 8,971,419, which is a continuation of application No. PCT/KR2012/007468, filed on Sep. 18, 2012.

(60) Provisional application No. 61/537,029, filed on Sep. 20, 2011, provisional application No. 61/545,594, filed on Oct. 11, 2011.

(51) Int. Cl.
| | |
|---|---|
| H04N 19/176 | (2014.01) |
| H04N 19/134 | (2014.01) |
| H04N 19/14 | (2014.01) |
| H04N 19/117 | (2014.01) |
| H04N 19/82 | (2014.01) |
| H04N 19/136 | (2014.01) |
| H04N 19/196 | (2014.01) |
| H04N 19/172 | (2014.01) |
| H04N 19/60 | (2014.01) |
| H04N 19/61 | (2014.01) |
| G06T 5/00 | (2006.01) |

(52) U.S. Cl.
CPC ........... *H04N 19/136* (2014.11); *H04N 19/14* (2014.11); *H04N 19/159* (2014.11); *H04N 19/172* (2014.11); *H04N 19/176* (2014.11); *H04N 19/196* (2014.11); *H04N 19/60* (2014.11); *H04N 19/61* (2014.11); *H04N 19/82* (2014.11); *G06T 5/001* (2013.01)

(56) References Cited

U.S. PATENT DOCUMENTS

| | | | |
|---|---|---|---|
| 7,440,501 B2 | 10/2008 | Sun | |
| 7,450,641 B2 | 11/2008 | Sun | |
| 7,613,240 B2 | 11/2009 | Sun | |
| 7,787,542 B2 | 8/2010 | Sun | |
| 7,907,667 B2 | 3/2011 | Sun | |
| 7,929,610 B2 | 4/2011 | Sun | |
| 7,961,963 B2 | 6/2011 | Sun | |
| 8,040,957 B2 | 10/2011 | Sun | |
| 8,175,168 B2 | 5/2012 | Sun | |
| 8,184,713 B2 | 5/2012 | Kim | |
| 8,805,100 B2* | 8/2014 | Ikai | .......... G06T 9/00 |
| | | | 375/240.16 |
| 8,971,419 B2* | 3/2015 | Park | ...... H04N 19/136 |
| | | | 375/240.29 |
| 9,986,263 B2 | 5/2018 | Park et al. | |
| 2002/0136303 A1 | 9/2002 | Sun | |
| 2002/0146072 A1 | 10/2002 | Sun | |
| 2003/0053541 A1 | 3/2003 | Sun | |
| 2004/0190626 A1 | 9/2004 | Sun | |
| 2005/0169373 A1 | 8/2005 | Hong | |
| 2005/0175103 A1 | 8/2005 | Sun | |
| 2006/0126962 A1* | 6/2006 | Sun | ....... H04N 19/139 |
| | | | 382/268 |
| 2006/0146941 A1* | 7/2006 | Cha | ......... H04N 19/61 |
| | | | 375/240.29 |
| 2006/0171472 A1 | 8/2006 | Sun | |
| 2006/0209959 A1 | 9/2006 | Sun | |
| 2006/0210185 A1 | 9/2006 | Sun | |
| 2006/0268988 A1 | 11/2006 | Sun | |
| 2007/0025448 A1 | 2/2007 | Cha et al. | |
| 2007/0031065 A1 | 2/2007 | Sun | |
| 2007/0098076 A1 | 5/2007 | Sun | |
| 2007/0098077 A1 | 5/2007 | Sun | |
| 2007/0098278 A1 | 5/2007 | Sun | |
| 2007/0230564 A1* | 10/2007 | Chen | .............. H04N 21/234327 |
| | | | 375/240.01 |
| 2008/0095244 A1 | 4/2008 | Kim | |
| 2009/0245351 A1 | 10/2009 | Watanabe | |
| 2010/0260264 A1 | 10/2010 | Sun | |
| 2011/0032990 A1 | 2/2011 | Choi et al. | |
| 2011/0116549 A1* | 5/2011 | Sun | ....... H04N 19/139 |
| | | | 375/240.16 |
| 2014/0334558 A1 | 11/2014 | Sze et al. | |

FOREIGN PATENT DOCUMENTS

| | | |
|---|---|---|
| CN | 101651829 A | 2/2010 |
| CN | 101754010 A | 6/2010 |
| EP | 1555832 A2 | 1/2005 |
| JP | 2009-246432 A | 10/2009 |
| KR | 10-2008-0005210 A | 1/2008 |
| KR | 10-0819289 B1 | 4/2008 |
| KR | 1020080114375 A | 12/2008 |
| KR | 10-0959436 B1 | 5/2010 |
| KR | 10-2011-0020391 A | 3/2011 |

OTHER PUBLICATIONS

Park S. et al: "Non-CE12: Simplified BS calculation process", 98 MPEG Meeting pp. 1-11, Nov. 22, 2011; XP030050296.

Hao Chen et al: "An effective method of deblocking filter for H.264/AVC", Communication and Information Technologies, Oct. 1, 2007; pp. 1092-1095, XP031166624.

International Search Report dated Jan. 10, 2013 for Application No. PCT /KR2012/007468 with English Translation, 10 pages.

B. Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, Jul. 14-22, 2011, JCTVC-F803.

JCTVC-F803_d6: Joint Collaborative Team on Video Coding (JCT-VC) of ITU-T SG16 WP3 and ISO/IEC JTC1/SC29/WG11, 6th Meeting: Torino, IT, Jul. 14-22, 2011, WD4: Working Draft 4 of High-Efficiency Video Coding, Editor, Bross et al. (229 Pages).

* cited by examiner

METHOD AND APPARATUS FOR ENCODING/DECODING IMAGE INFORMATION

CROSS REFERENCE TO RELATED APPLICATIONS

This application is a Continuation of U.S. patent application Ser. No. 15/962,939, filed Apr. 25, 2018, which is a Continuation of U.S. patent application Ser. No. 14/615,771, filed Feb. 6, 2015, now U.S. Pat. No. 9,986,263, which is a Continuation of U.S. patent application Ser. No. 14/220,753, filed Mar. 20, 2014, now U.S. Pat. No. 8,971,419, which is a Continuation of International Application No. PCT/KR2012/007468, filed Sep. 18, 2012, which claims the benefit of U.S. Provisional Application No. 61/537,029, filed Sep. 20, 2011, and U.S. Provisional Application No. 61/545,594, filed Oct. 11, 2011, all of which are hereby incorporated by reference in their entirety for all purposes as if fully set forth herein.

TECHNICAL FIELD

The present invention relates to a video information compression technique, and more particularly, to a method of applying a deblocking filter as an in-loop filter.

BACKGROUND ART

Recently, demands for a high-resolution and high-quality video have increased in various fields of applications. As an image has higher resolution and higher quality, an amount of data on the video increases more.

Accordingly, when image data is transferred using media such as existing wired or wireless broadband lines or video data is stored in existing storage media, the information transfer cost and the information storage cost increase.

High-efficiency video compressing techniques can be used to effectively transfer, store, and reproduce information on high-resolution and high-quality videos.

Inter prediction and intra prediction can be used to enhance video compression efficiency. In the inter prediction, pixel values of a current picture are predicted using information of other pictures. In the intra prediction, the pixel values are predicted using inter-pixel relationships in the same picture.

Various methods for making a video equal to an original video can be applied to a processing unit of a predicted picture, for example, a block. Accordingly, a decoder can decode a video more accurately (more closely to an original video), and an encoder can encode a video to reconstruct the video more accurately.

SUMMARY OF INVENTION

Technical Problem

An object of the present invention is to provide a method and an apparatus which can reconstruct an image to be close to an original image by effectively removing deblocking artifacts in application of deblocking filtering.

Another object of the present invention is to provide a method and an apparatus which can enhance compression efficiency by reducing complexity in application of deblocking filtering.

Still another object of the present invention is to provide a method and an apparatus which can reduce complexity by effectively setting a unit block for deciding a bS (boundary strength) value in application of deblocking filtering.

Still another object of the present invention is to provide a method and an apparatus which can reduce complexity by effectively setting a bS value in application of deblocking filtering.

Technical Solution

According to an aspect of the invention, there is provided a boundary strength (bS) deriving method including the steps of deriving a boundary of a deblocking filtering unit block which is a unit block on which deblocking filtering is performed; and setting a bS for each bS setting unit block in the deblocking filtering unit block, wherein the step of setting the bS includes setting a bS value of a target boundary corresponding to the boundary of the deblocking filtering unit block as the bS setting unit block.

The step of setting the bS may include setting the bS value of the target boundary to bS2 in a case that at least one of two blocks with the target boundary as a boundary is intra-coded; setting the bS value of the target boundary to bS1 in a case that the target boundary is a deblocking filtering target and not in the case that at least one of two blocks with the target boundary as a boundary is intra-coded; and setting the bS value of the target boundary to bS0 in a case that the target boundary is not a deblocking filtering target, and the values of bS0, bS1, and bS2 satisfy a relationship of bS0<bS1<bS2.

The case in which the bS is set to bS1 may not be a case in which at least one of two blocks with the target boundary as a boundary is intra-coded and may include: a case in which at least one of the at least one of two blocks with the target boundary as a boundary includes a transform coefficient other than 0; and a case in which the two blocks with the target boundary as a boundary have different reference pictures or different motion vectors.

The step of deriving the boundary of the deblocking filtering unit block and the step of setting the bS may be first performed on vertical edges in a picture including the deblocking filtering unit block and may be then performed on horizontal edges in the picture including the deblocking filtering unit blocks.

The deblocking filtering unit block may be any one of a coding block, a transform block, a prediction block, and an 8×8 pixel block. The bS setting unit block may be a 4×4 pixel block.

According to another aspect of the invention, there is provided a deblocking filtering method including the steps of: setting a boundary strength (bS) of a target boundary by bS setting unit blocks; and applying deblocking filtering on the target boundary by deblocking filtering unit blocks, wherein the step of setting the bS includes setting the bS value of the target boundary corresponding to the deblocking filtering unit block as the boundary of the bS setting unit block.

The step of setting the bS may include setting the bS value of the target boundary to bS2 in a case that at least one of two blocks with the target boundary as a boundary is intra-coded; setting the bS value of the target boundary to bS1 in a case that the target boundary is a deblocking filtering target and not in the case that at least one of two blocks with the target boundary as a boundary is intra-coded; and setting the bS value of the target boundary to bS0 when the target boundary is not a deblocking filtering target, and the values of bS0, bS1, and bS2 satisfy a relationship of bS0<bS1<bS2.

The case in which the bS is set to bS1 may not be a case in which at least one of two blocks with the target boundary as a boundary is intra-coded and may include: a case in which at least one of the at least one of two blocks with the target boundary as a boundary includes a transform coefficient other than 0; and a case in which the two blocks with the target boundary as a boundary have different reference pictures or different motion vectors.

The step of deriving the boundary of the deblocking filtering unit block and the step of setting the bS may be first performed on vertical edges in a picture including the deblocking filtering unit block and may be then performed on horizontal edges in the picture including the deblocking filtering unit blocks.

When the bS value set for the target boundary is larger than bS0 and the deblocking filtering is performed thereon, it may be determined which of strong filtering and weak filtering should be performed.

The determination on which of strong filtering and weak filtering should be performed may be performed on the basis of samples of the two blocks with the target boundary as a boundary, may be performed on the basis of samples to be subjected to the deblocking filtering out of samples in sample rows with the target boundary as a boundary when the target boundary is a vertical edge, and may be performed on the basis of samples to be subjected to the deblocking filtering out of samples in sample columns with the target boundary as a boundary when the target boundary is a horizontal edge.

When it is determined that the weak filtering should be performed, the filtering may be performed on the samples selected from the samples to be subjected to the deblocking filtering.

The deblocking filtering unit block may be any one of a coding block, a transform block, a prediction block, and an 8×8 pixel block. The bS setting unit block may be a 4×4 pixel block.

Advantageous Effects

According to the aspects of the present invention, it is possible to reconstruct an image to be close to an original image by effectively removing deblocking artifacts in application of deblocking filtering.

According to the aspects of the present invention, it is possible to enhance compression efficiency by reducing complexity in application of deblocking filtering.

According to the aspects of the present invention, it is possible to reduce complexity by effectively setting a unit block for deciding a bS (boundary strength) value in application of deblocking filtering. According to the aspects of the present invention, it is also possible to reduce complexity by effectively setting a bS value in application of deblocking filtering.

DESCRIPTIONS OF DRAWINGS

MODE FOR INVENTION

Figure 1:
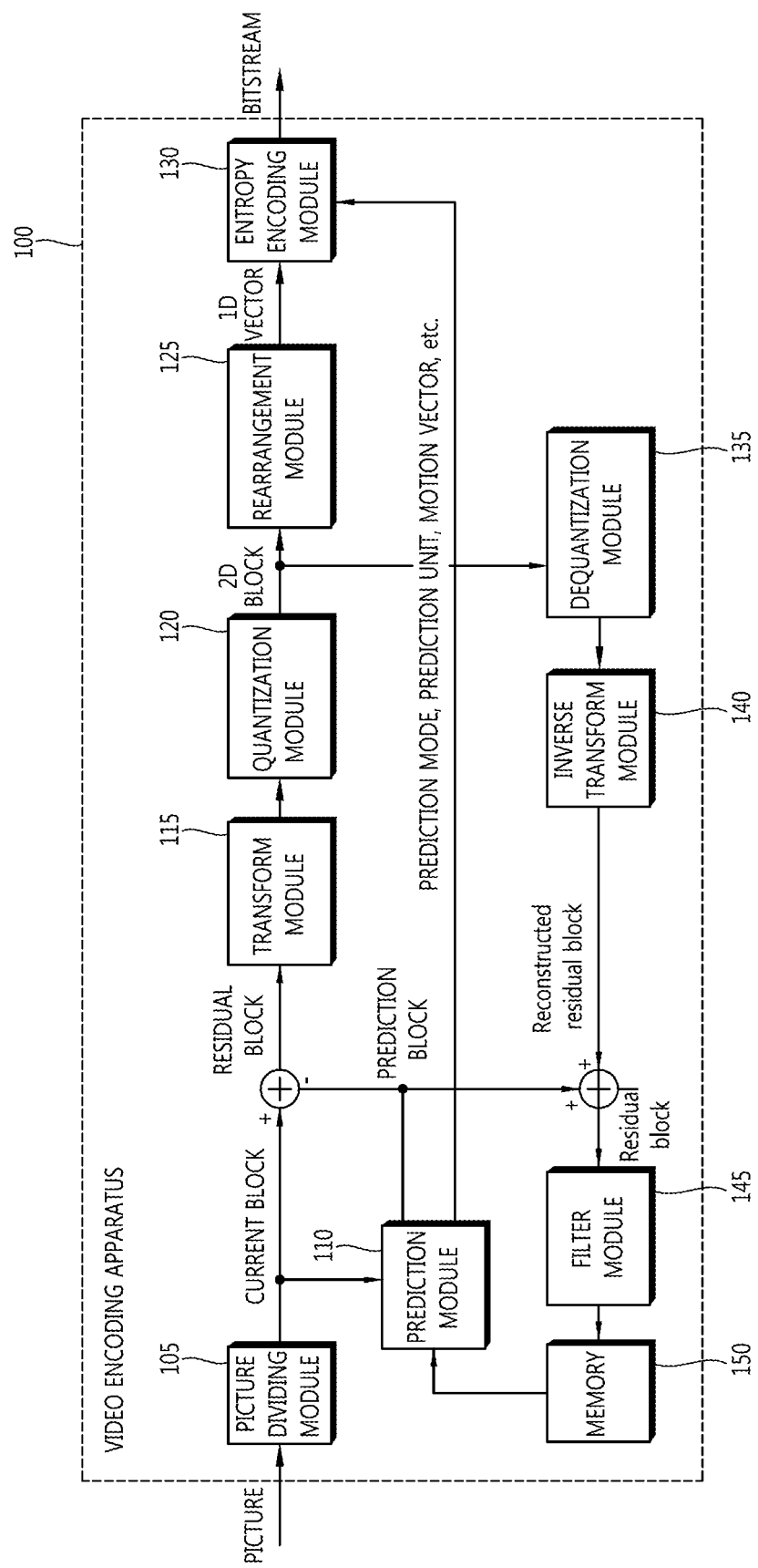
FIG. 1 is a block diagram schematically illustrating an encoding apparatus (video encoder) according to an embodiment of the invention.

The present invention can be variously modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in a video encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

FIG. 1 is a block diagram schematically illustrating an encoding apparatus (video encoder) according to an embodiment of the invention. Referring to FIG. 1, a video encoding apparatus 100 includes a picture dividing module 105, a prediction module 110, a transform module 115, a quantization module 120, a rearrangement module 125, an entropy encoding module 130, an quantization module 135, an inverse transform module 140, a filter module 145, and a memory 150.

The picture dividing module 105 can divide an input picture into at least one processing unit blocks. Here, a block as a processing unit may be a prediction unit (hereinafter, referred to as a "PU"), a transform unit (hereinafter, referred to as a "TU"), or a coding unit (hereinafter, referred to as a "CU").

The prediction module 110 includes an inter prediction module that performs an inter prediction process and an intra prediction module that performs an intra prediction process, as described later. The prediction module 110 performs a prediction process on the processing units of a picture divided by the picture dividing module 105 to generate a prediction block. In the prediction module 110, the processing unit of a picture may be a CU, a TU, or a PU. The prediction module 110 can determine whether the prediction performed on the corresponding processing unit is an inter prediction or an intra prediction, and can determine specific details (for example, a prediction mode) of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process is performed on the basis of information on at least one of a previous picture and/or a subsequent picture of a current picture to generate a prediction block. In the intra prediction, a prediction process is performed on the basis of pixel information of a current picture to generate a prediction block.

In the inter prediction, a skip mode, a merge mode, an MVP (Motion Vector Prediction) mode, and the like can be used. In the inter prediction, a reference picture is selected for a PU, and a reference block having the same size as the PU can be selected by integer pixel samples. Then, a prediction block in which a residual signal from the current PU is minimized and the motion vector magnitude is minimized is generated.

The prediction block may be generated in the unit of integer pixel samples or in the unit of pixel samples less than an integer pixel such as ½ pixel samples and ¼ pixel samples. Here, the motion vector can also be expressed in the unit of pixel samples less than an integer pixel. For example, luma pixels can be expressed in the unit of ¼ pixels and chroma pixels can be expressed in the unit of ⅛ pixels.

Information such as an index, a motion vector (for example, a motion vector predictor), and a residual signal of a reference picture selected through the inter prediction is entropy-encoded and is transmitted to a decoder. When the skip mode is applied, a prediction block can be used as a reconstructed block and thus the residual signal may not be generated, transformed, quantized, and transmitted at all.

When the intra prediction is performed, the prediction mode can be determined in the unit of PU and the prediction process can be performed in the unit of PU. Alternatively, the prediction mode may be determined in the unit of PU and the inter prediction may be performed in the unit of TU.

The prediction modes in the intra prediction include 33 directional prediction modes and at least two non-directional modes. The non-directional modes include a DC prediction mode and a planar mode.

In the intra prediction, a prediction block can be generated after a filter is applied to a reference sample. At this time, it can be determined whether a filter should be applied to a reference sample depending on the intra prediction mode and/or the size of a current block.

A PU has various sizes and shapes. For example, in case of inter prediction, a PU may be blocks having sizes such as 2N×2N, 2N×N, N×2N, and N×N (where N is an integer). In case of intra prediction, a PU may be blocks having sizes such as 2N×2N and N×N (where N is an integer). A PU with a size of N×N can be set to be applied to only a specific case. For example, the PU with a size of N×N can be set to be used for only a smallest CU or can be set to be used for only the intra prediction. In addition to the PUs with the above-mentioned sizes, PUs such as an N×mN block, an mN×N block, a 2N×mN block, and an mN×2N block (where m<1) may be additionally defined and used.

Residual values (a residual block or a residual signal) between the generated prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TU and generates transform coefficients. The transform unit in the transform module 115 may be a TU and may have a quad tree structure. The size of the transform unit can be determined within a predetermined largest and smallest size range. The transform module 115 can transform the residual block using DCT (Discrete Cosine Transform) and/or DST (Discrete Sine Transform).

The quantization module 120 can quantize the residual values transformed by the transform module 115 and can generate quantization coefficients. The values calculated by the quantization module 120 can be provided to the dequantization module 135 and the rearrangement module 125.

The rearrangement module 125 can rearrange the quantization coefficients provided from the quantization module 120. By rearranging the quantization coefficients, it is possible to enhance the encoding efficiency in the entropy encoding module 130. The rearrangement module 125 can rearrange the quantization coefficients in the form of a two-dimensional block to the form of a one-dimensional vector through the use of a coefficient scanning method. The rearrangement module 125 can enhance the entropy encoding efficiency in the entropy encoding module 130 by changing the order of coefficient scanning on the basis of stochastic statistics of the coefficients transmitted from the quantization module.

The entropy encoding module 130 performs an entropy encoding process on the quantization coefficients rearranged by the rearrangement module 125. Examples of the entropy encoding method include an exponential golomb method, a CAVLC (Context-Adaptive Variable Length Coding) method, and a CABAC(Context-Adaptive Binary Arithmetic Coding) method.

The entropy encoding module 130 can encode a variety of information such as residual coefficient information and block type information of a coding unit, prediction mode information, dividing unit information, prediction unit information, transfer unit information, motion vector information, reference picture information, block interpolation information, and filtering information transmitted from the rearrangement module 125 and the prediction module 110.

The entropy encoding module 130 may give a predetermined change to a parameter set or a syntax to be transmitted, if necessary.

The dequantization module 135 dequantizes the values quantized by the quantization module 120. The inverse transform module 140 inversely transforms the values inversely quantized by the dequantization module 135. The residual values generated by the dequantization module 135 and the inverse transform module 140 are merged with the prediction block predicted by the prediction module 110 to generate a reconstructed block.

In FIG. 1, a residual block and a prediction block are added to generate a reconstructed block by an adder. At this time, the adder may be considered as a particular module (reconstructed Block creating module) that generates a reconstructed block.

The filter module 145 applies a deblocking filter, an ALF (Adaptive Loop Filter), an SAO (Sample Adaptive Offset) to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter module 145 may not perform a filtering process on a reconstructed block used for the inter prediction.

The memory 150 stores the reconstructed block or picture calculated by the filter module 145. The reconstructed block or picture stored in the memory 150 is provided to the prediction module 110 that performs the inter prediction.

Figure 2:
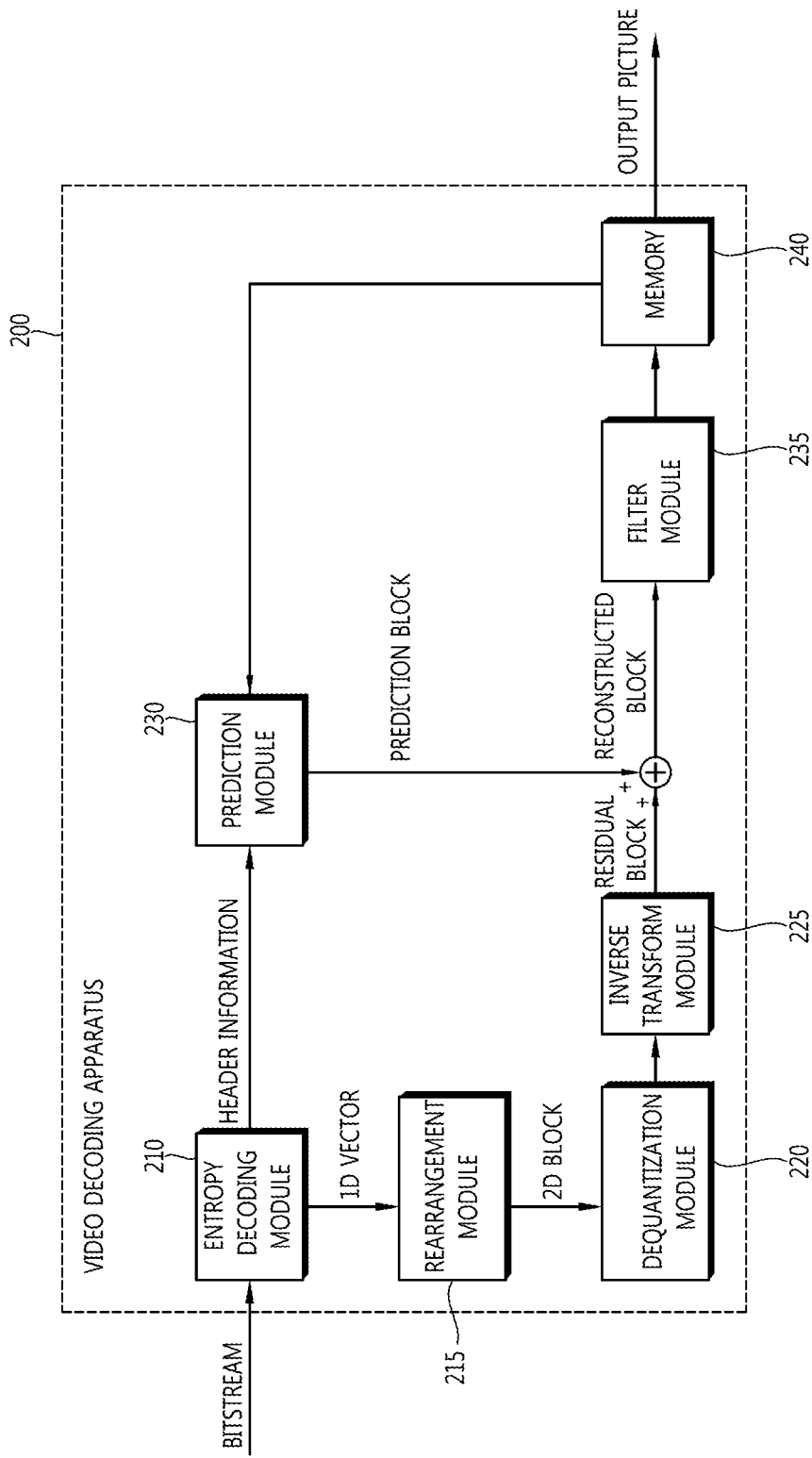
FIG. 2 is a block diagram schematically illustrating a video decoder according to an embodiment of the invention.

FIG. 2 is a block diagram schematically illustrating a video decoding apparatus according to an embodiment of the invention. Referring to FIG. 2, a video decoding apparatus 200 includes an entropy decoding module 210, a rearrangement module 215, an dequantization module 220, an inverse transform module 225, a prediction module 230, a filter module 235, and a memory 240.

When a video bitstream is input from the video encoding apparatus, the input bitstream is decoded on the basis of the order in which video information is processed by the video encoding apparatus.

For example, when the image encoding device uses a variable length coding (hereinafter, referred to as "VLC") method such as the CAVLC to perform the entropy encoding process, the video decoding module 210 can realize the same VLC table as used in the video encoding device and can perform the entropy decoding process. When the video encoding device uses the CABAC to perform the entropy encoding process, the entropy decoding module 210 can perform the entropy decoding process using the CABAC to correspond thereto.

Information for creating a prediction block out of the information decoded by the entropy decoding module 210 is provided to the prediction module 230, and the residual values entropy-decoded by the entropy decoding module are input to the rearrangement module 215.

The rearrangement module 215 rearranges the bitstream entropy-decoded by the entropy decoding module 210 on the basis of the rearrangement method in the video encoding device. The rearrangement module 215 reconstructs and rearranges coefficients expressed in the form of one-dimensional vector into coefficients of a two-dimensional block form. The rearrangement module 215 is provided with information associated with the coefficient scanning performed by the encoding module and can perform the rearrangement using a method of inversely scanning the coefficients on the basis of the scanning order in which the scanning is performed by the corresponding encoding module.

The dequantization module 220 performs dequantization on the basis of the quantization parameters provided from the encoder and the rearranged coefficient values of the block.

The inverse transform module 225 performs the inverse DCT and inverse DST of the DCT and DST, which has been performed by the transform module of the video encoding device, on the quantization result from the video encoding device. The inverse transform is performed on the basis of a transfer unit or a division unit of a picture determined by the video encoding device. The transform module of the video encoding device selectively performs the DCT and DST depending on plural information elements such as the prediction method, the size of the current block, and the prediction direction, and the inverse transform module 225 of the video decoding device performs the inverse transform on the basis of the transform information on the transform performed by the ttansform module of the video encoding device.

The prediction module 230 generates a prediction block on the basis of prediction block creation information provided from the entropy decoding module 210 and the previously-decoded block and/or picture information provided from the memory 240.

When the prediction mode of a current PU is an intra prediction mode (intra mode), an intra prediction process of creating a prediction block on the basis of pixel information in the current picture can be performed.

When the prediction mode of a current PU is an inter prediction mode (inter mode), an inter prediction process can be performed on the current PU on the basis of information included in at least one of a previous picture or a subsequent picture of the current picture. At this time, motion information necessary for the inter prediction of the current PU provided from the video encoding apparatus, for example, information on motion vectors, reference picture indices, and the like, can be derived from a skip flag, a merge flag, and the like received from the encoder.

A reconstructed block is generated using the prediction block generated by the prediction module 230 and the residual block provided from the inverse transform module 225. In FIG. 2, the prediction block and the residual block are added to generate a reconstructed block by an adder. At this time, the adder may be considered as a particular module (reconstructed block creating module) that generates a reconstructed block.

When the skip mode is applied, the residual block may be not be transmitted and the prediction block can be used as the reconstructed block.

The reconstructed block and/or picture is provided to the filter module 235. The filter module 235 performs a deblocking filtering process, an SAO (Sample Adaptive Offset)

process, and/or an adaptive loop filtering process on the reconstructed block and/or picture.

The memory 240 stores the reconstructed picture or block for use as a reference picture or a reference block and supplies the reconstructed picture to the output module.

On the other hand, as described above, the filter modules of the encoder and the decoder can apply a deblocking filter, an ALF (Adaptive Loop Filter), or an SAO (Sample Adaptive Offset) as an in-loop filter.

The deblocking filter removes artifacts between blocks due to the prediction, transform, quantization in the unit of blocks. The deblocking filter is applied to a prediction unit edge or a transform unit edge and a predetermined smallest block size can be set for application of the deblocking filter.

In order to apply the deblocking filter, a boundary strength (BS) of a horizontal or vertical filter boundary is first determined. Then, it is determined whether the filtering should be performed in the unit of blocks on the basis of the BS. When it is determined that the filtering should be performed, what filter should be applied is determined. A filter to be applied can be selected from a weak filter and a strong filter. The filter module applies the selected filter to the boundary of the corresponding block.

The ALF (Adaptive Loop Filter) may be performed after the SAO to be described later is performed. The ALF functions to compensate for an encoding error using a Wiener filter and is globally applied to slices unlike the SAO. The ALF may be performed in case of only HE (High Efficiency).

The SAO is a procedure of reconstructing an offset difference of an image, which has been subjected to the deblocking filtering, from an original image in the unit of pixels. A coding error can be compensated for through the SAO and the coding error may be based on quantization or the like. The SAO is classified into two types of a band offset and an edge offset.

As described above, when an image (picture) is reconstructed in the unit of blocks (for example, CU, PU, and TU), block distortion may occur in the boundaries between the reconstructed blocks. A deblocking filter can be applied to prevent the block distortion. The deblocking filter can be selectively applied to a position at which the block distortion is likely to occur in the same image or picture and a position at which the block distortion is not likely to occur. For example, the deblocking filter can be applied in different ways to the position at which the block distortion is likely to occur and the position at which the block distortion is not likely to occur.

For this purpose, boundary strength (hereinafter, referred to as "bS") of a boundary between blocks can be determined depending on whether the boundary between blocks corresponds to a boundary to which the deblocking filter should be applied, whether neighboring blocks are blocks having intra coding applied thereto, or the like, and the deblocking filtering can be applied on the basis of the determined bS.

On the other hand, when a CU is an I_PCM CU, that is, when a CU is a PCM (Pulse Coding Modulation) to which intra prediction should be applied, the deblocking filtering is not performed. Since the IPCM mode does not require the quantization and transform processes, the same values as the original data are reconstructed.

Therefore, in order to reconstruct the best image quality (original image quality), the in-loop filter is not applied to a CU of the I_PCM mode (I_PCM CU). For example, in the deblocking filtering process, the deblocking filter is prevented from being applied to the I_PCM CU by setting the quantization parameter qP of the I_PCM CU to 0 (zero).

Figure 3:
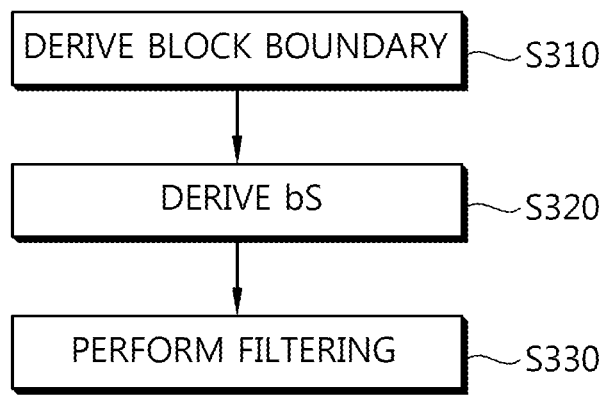
FIG. 3 is a flowchart schematically illustrating a method of applying a deblocking filter according to the invention.

FIG. 3 is a flowchart schematically illustrating a method of applying a deblocking filter according to the invention. The deblocking filtering shown in FIG. 3 can be performed by an encoder and a decoder. For example, the filtering modules shown in FIGS. 1 and 2 can perform the deblocking filtering process shown in FIG. 3.

The deblocking filtering is first applied to a vertical edge between blocks in a current picture and is then applied to a horizontal edge between blocks in the current picture. The deblocking filtering is applied to the horizontal edge in the current picture with the modified sample by deblocking filtering of vertical edges.

Therefore, the deblocking filtering procedure illustrated in FIG. 3 can be first applied to the vertical edge in the current picture and then can be applied to the horizontal edge in the current picture.

Referring to FIG. 3 for the edge between blocks, a block boundary is derived for application of the deblocking filtering (S310).

The filter module sets the size of a current coding block or a current LCU (Largest Coding Unit) (hereinafter, a coding block in this description includes an LCU for the purpose of convenience for explanation) and determines whether the boundary of the current coding block is a boundary of a current picture, whether the boundary of the current coding block is a boundary to which the deblocking filter is applied as a boundary of a tile, and whether the boundary of the current coding block is a boundary to which the deblocking filter as a boundary of a slice.

For example, when the deblocking filter is applied to a vertical edge and the left boundary of the current coding block is the left boundary of the current picture, the left boundary of the current coding block can be removed from the target of the deblocking filtering. When the left boundary of the current coding block is the left boundary of the current tile and a filter is determined not to be applied to the edge of the current tile or when the left boundary of the current coding block is the left boundary of the current slice and a filter is determined not to be applied to the edge of the current slice, the left boundary of the current coding block can be removed from the target of the deblocking filtering. Therefore, otherwise, in application of the deblocking filtering to the vertical edge, the deblocking filtering can be applied to the left boundary of the current coding block.

When the deblocking filter is applied to a horizontal edge and the top boundary of the current coding block is the top boundary of the current picture, the top boundary of the current coding block can be removed from the target of the deblocking filtering. When the top boundary of the current coding block is the top boundary of the current tile and a filter is determined not to be applied to the edge of the current tile or when the top boundary of the current coding block is the top boundary of the current slice and a filter is detei lined not to be applied to the edge of the current slice, the top boundary of the current coding block can be removed from the target of the deblocking filtering. Otherwise, in application of the deblocking filtering to the horizontal edge, the deblocking filtering can be applied to the top boundary of the current coding block.

The application of the filtering to a boundary in this description means that the filtering is performed on predetermined samples located on both sides of the boundary.

The filter module can derive block boundaries of vertical edges of a transform block and a prediction block when the deblocking filtering is applied to a vertical edge of a picture, and can derive block boundaries of horizontal edges of the transform block and the prediction block when the deblocking filtering is applied to a horizontal edge of the picture.

When the edge of the transform block is an edge of a coding block, the boundary of the transform block can be derived for the corresponding edge depending on whether the deblocking filtering should be applied to the corresponding edge. When the transform block is divided, the boundaries of the divided blocks can be derived.

The filter module can derive the boundary of each partition of a prediction block. For example, when the partitions of a prediction block are 2N×N pixel blocks, N×N pixel blocks, 2N×nU pixels, or 2N×nD pixel blocks (where N, U, and D are an integer corresponding to the number of pixels and n is an integer corresponding to the number of prediction blocks in a coding block), an edge for each partition can be derived. Subsequently, the bS of the block boundary to which the deblocking filter should be applied is derived (S320). The bS is determined for each edge in the current coding block. The bS is derived for each vertical edge when the deblocking filtering is applied to the vertical edges in a picture, and the bS is derived for each horizontal edge when the deblocking filtering is applied to the horizontal edges in the picture.

The derivation of the bS can be performed for each predetermined unit. For example, the bS may be derived for each edge of a transform block or may be derived for each edge of a prediction block. The bS may be derived in the unit of blocks with a predetermined size, for example, in the unit of 8×8 pixel blocks or 4×4 pixel blocks.

In addition, the bS may be derived for an edge of a block satisfying a specific condition out of a transform block, a prediction block, and a predetermined-sized block in a current coding block. For example, the bS may be derived for each larger block of the smaller block of a transform block (for example, TU) and a prediction block (for example, PU) and a predetermined-size block (for example, 8×8 pixel block).

In other words, the bS can be determined in the unit of pixels (for example, L pixel unit when the bS decision unit is a L×L pixel block (L is an integer)) corresponding to the size of the block which serves as a unit for deciding the bS at the boundary of a block to be subjected to the deblocking filtering. The specific derivation of the bS will be described later.

Subsequently, a filtering process is performed on the block boundary on the basis of the bS (S330).

For example, in case of luma samples, when the bS for a target edge is equal to or less than a predetermined reference bS, for example, $bS_{th1}$, the deblocking filtering may not be applied to the corresponding edge. In case of chroma samples, when the bS for a target edge is equal to or less than a predetermined reference bS, for example, bS, the deblocking filtering may not be applied to the corresponding edge. The reference bS values $bS_{th1}$ and $bS_{th2}$ may be set to be equal to or different from each other.

In order to efficiently apply the deblocking filtering, an additional threshold value (referred to as Th1 for the purpose of convenience for explanation) may be set. For example, when the reference bS value is set to 0 and the bS value for a target edge is larger than 0, the ON/OFF of the deblocking filtering at the level of blocks can be determined using Th1. For example, when the value derived from the target edge is larger than Th1, the deblocking filtering may be applied to the target edge.

An example where the deblocking filtering is applied to vertical edges in a picture will be first described. As the value derived from a target vertical edge for the purpose of comparison with Th1, a difference between filtering target samples in two blocks with the vertical edge as a boundary in a specific sample row can be considered. For example, the sum $DL_k$ of differences (the sum of a difference between the first sample from the vertical edge and the second sample from the vertical edge and a difference between the third sample from the vertical edge and the second sample from the vertical edge, for example, when three samples from the vertical edge should be subjected to the filtering) between filtering target samples adjacent to the vertical edge in the left block of the vertical edge out of the samples in the k-th sample row (where k is an integer) can be calculated, and the sum $DR_k$ of differences (the sum of a difference between the first sample from the vertical edge and the second sample from the vertical edge and a difference between the third sample from the vertical edge and the second sample from the vertical edge, for example, when three samples from the vertical edge should be subjected to the filtering) between filtering target samples adjacent to the vertical edge in the right block of the vertical edge can be derived. The sum $D_k$ of $DL_k$ and $DR_k$ can be compared with Th1 and the deblocking filtering can be applied to the vertical edge when $D_k$ is smaller than Th1. When $D_k$ is smaller than Th1, it can be considered that the vertical boundary is not a boundary (for example, an actual image boundary in an original picture) to which it is not effective to apply the deblocking filtering on the basis of the quantization parameter and it can be determined that a picture is reconstructed closer to the original picture by applying the deblocking filtering.

At this time, in two blocks with the vertical edge as a boundary, the sum of differences between neighboring filtering target samples in plural sample rows may be considered instead of considering the sum of differences between neighboring filtering target samples in only one sample row. For example, in two blocks with the vertical edge as a boundary, when the sum D ($=D_k+D_{k+j}$) the sum $D_k$ of differences between filtering target samples in the k-th sample row and the sum $D_{k+j}$ of differences between filtering target samples in the (k+j)-th sample row (where k is an integer) is smaller than the threshold value Th1, it may be determined that the deblocking filter should be applied to the vertical edge.

An example where the difference j between two sample rows is set to 3 will be described below. When D ($=D_2+D_5$) for the second sample row and the fifth sample row is smaller than Th1, the deblocking filter may be applied to the corresponding vertical edge. When the difference j between two sample rows is set to 3 and the sum D ($=D_0+D_3$) for the zeroth sample row and the third sample row is smaller than Th1, the deblocking filter may be applied to the corresponding vertical edge.

At this time, in order to effectively reflect characteristics of each block and each sample row, the D values which are the absolute values of the sums between differences between filtering target samples for each sample row and each block may be derived. In this case, the D value for the k-th sample row and the (k+j)-th sample row of the left block (L) and the right block (R) with the vertical edge as a boundary can be derived by Expression 1.

$$D=abs(DL_k)+abs(DL_{k+j})+abs(DR_k)+abs(DR_{k+j}) \quad \text{Expression 1}$$

As described above, $DL_K$ is the sum of differences between the filtering target samples adjacent to the vertical edge in the k-th sample row of the left block. For example, when three samples adjacent to the vertical edge are the application target of the deblocking filtering, $DL_K$ can be derived by the sum of the difference between the first sample from the vertical edge and the second sample from the vertical edge in the k-th sample row of the left block of the vertical edge and the difference between the third sample from the vertical edge and the second sample from the vertical edge. $DR_K$ is the sum of differences between the filtering target samples adjacent to the vertical edge in the k-th sample row of the right block. For example, when three samples adjacent to the vertical edge are the application target of the deblocking filtering, $DR_K$ can be derived by the sum of the difference between the first sample from the vertical edge and the second sample from the vertical edge in the k-th sample row of the right block of the vertical edge and the difference between the third sample from the vertical edge and the second sample from the vertical edge.

When the sum of differences between the adjacent filtering target samples is taken in consideration of plural sample rows as described above, the deblocking filtering can be more effectively applied by considering the sum of differences between the adjacent filtering target samples in each sample row. For example, $D_k$ can be defined as expressed by Expression 2 by referring to Expression 1 and considering only the k-th sample row.

$$D_k = \text{abs}(DL_k) + \text{abs}(DR_k) \qquad \text{Expression 2}$$

For example, when the k-th sample row and the (k+3)-th sample row are considered for the vertical edge as described above and D is smaller than Th1, and $D_k$ for the k-th sample row and $D_{k+3}$ for the (k+3)-th sample row are each smaller than a half of Th1 (Th1/2), strong filtering can be applied to the vertical edge. On the other hand, when D is smaller than Th1 but $D_k$ is not smaller than Th1/2 or $D_{k+3}$ is not smaller than Th1/2, weak filtering can be applied to the vertical edge.

When the weak filtering is applied, the filtering can be applied to only specific samples out of the filtering target samples. In this case, a filtering coefficient other than that in the strong filtering may be applied. For example, when the filtering target samples are six samples (three samples on the left side and three samples on the right side) located on the left and right sides of the vertical edge, the strong filtering can be applied to all the filtering target samples and the weak filtering can be applied to two samples located on the left side of the target edge and two samples located on the right side of the target edge. At this time, the filtering coefficients of the strong filtering and the weak filtering can be different from each other.

An example where the deblocking filtering is applied to horizontal edges in a picture will be first described. As the value derived from a target horizontal edge for the purpose of comparison with Th1, a difference between filtering target samples in two blocks with the horizontal edge as a boundary in a specific sample column can be considered. As described in the example for the horizontal edge, the sum $DT_k$ of differences (the sum of a difference between the first sample from the horizontal edge and the second sample from the horizontal edge and a difference between the third sample from the horizontal edge and the second sample from the horizontal edge, for example, when three samples from the horizontal edge should be subjected to the filtering) between filtering target samples adjacent to the horizontal edge in the top block of the horizontal edge out of the samples in the k-th sample column (where k is an integer) can be calculated, and the sum $DB_k$ of differences (the sum of a difference between the first sample from the horizontal edge and the second sample from the horizontal edge and a difference between the third sample from the horizontal edge and the second sample from the horizontal edge, for example, when three samples from the horizontal edge should be subjected to the filtering) between filtering target samples adjacent to the horizontal edge in the bottom block of the horizontal edge can be derived. The sum $D_k$ of $DL_k$ and $DR_k$ can be compared with Th1 and the deblocking filtering can be applied to the horizontal edge when $D_k$ is smaller than Th1.

At this time, in two blocks with the horizontal edge as a boundary, the sum of differences between neighboring filtering target samples in plural sample columns may be considered. For example, in two blocks with the horizontal edge as a boundary, when the sum D ($=D_k+D_{k+j}$) the sum $D_k$ of differences between filtering target samples in the k-th sample column and the sum $D_{k+j}$ of differences between filtering target samples in the (k+j)-th sample column (where k is an integer) is smaller than the threshold value Th1, it may be determined that the deblocking filter should be applied to the horizontal edge.

An example where the difference j between two sample columns is set to 3 will be described below. When D ($=D_2+D_5$) for the second sample column and the fifth sample column is smaller than Th1, the deblocking filter may be applied to the corresponding horizontal edge. When the difference j between two sample columns is set to 3 and the sum D ($=D_0+D_3$) for the zeroth sample column and the third sample column is smaller than Th1, the deblocking filter may be applied to the corresponding horizontal edge.

The sample rows considered for the vertical edge and the sample columns considered for the horizontal edge may be sample rows and sample columns corresponding to each other. For example, when the zeroth sample row and the third-sample row are considered for the vertical edge, the zeroth sample column and the third sample column can be considered for the horizontal edge.

Similarly to the vertical edge, in order to effectively reflect characteristics of each block and each sample column, the absolute values of the sums between differences between filtering target samples for each sample column and each block may be taken. In this case, the D value for the k-th sample column and the (k+j)-th sample column of the top block (T) and the bottom block (B) with the horizontal edge as a boundary can be derived by Expression 3.

$$D = \text{abs}(DT_k) + \text{abs}(DT_{k+j}) + \text{abs}(DB_k) + \text{abs}(DB_{k+j}) \qquad \text{Expression 3}$$

As described above, $DT_K$ is the sum of differences between the filtering target samples adjacent to the horizontal edge in the k-th sample column of the top block. For example, when three samples adjacent to the horizontal edge are the application target of the deblocking filtering, $DT_K$ can be derived by the sum of the difference between the first sample from the horizontal edge and the second sample from the horizontal edge in the k-th sample column of the top block of the horizontal edge and the difference between the third sample from the horizontal edge and the second sample from the horizontal edge. $DB_K$ is the sum of differences between the filtering target samples adjacent to the horizontal edge in the k-th sample column of the bottom block. For example, when three samples adjacent to the horizontal edge are the application target of the deblocking filtering, $DB_K$ can be derived by the sum of the difference between the first sample from the horizontal edge and the second sample from the horizontal edge in the k-th sample column of the bottom block of the horizontal edge and the difference between the third sample from the horizontal edge and the second sample from the horizontal edge.

As described in the example for the vertical edge, the deblocking filtering can be more effectively applied by considering the sum of differences between the adjacent filtering target samples in each sample column. For example, $D_k$ can be defined as expressed by Expression 4 by referring to Expression 3 and considering only the k-th sample column.

$$D_k = \text{abs}(DT_k) + \text{abs}(DB_k) \qquad \text{Expresssion 4}$$

For example, when the k-th sample column and the (k+3)-th sample column are considered for the horizontal edge as described above and D is smaller than Th1, and $D_K$ for the k-th sample column and $D_{k+3}$ for the (k+3)-th sample column are each smaller than a half of Th1 (Th1/2), strong filtering can be applied to the horizontal edge. On the other hand, when D is smaller than Th1 but $D_k$ is not smaller than Th1/2 or $D_{k+3}$ is not smaller than Th1/2, weak filtering can be applied to the horizontal edge.

When the weak filtering is applied, the filtering can be applied to only specific samples out of the filtering target samples. In this case, a filtering coefficient other than that in the strong filtering may be applied. For example, when the filtering target samples are six samples (three samples on the top side and three samples on the bottom side) located on the top and bottom sides of the horizontal edge, the strong filtering can be applied to all the filtering target samples and the weak filtering can be applied to two samples located on the top side of the target edge and two samples located on the bottom side of the target edge. At this time, the filtering coefficients of the strong filtering and the weak filtering can be different from each other.

The strong filtering and the weak filtering may be applied to the vertical edges and the horizontal edges using the same method (for example, the same filter coefficient or offset).

As described above, when it is determined whether the deblocking filtering should be applied, which of the strong filter and the weak filter should be applied, and to what sample the weak filter should be applied, the filtering module can apply the deblocking filter on the basis of a predetermined method (for example, the same filter coefficient or offset). As described above, the deblocking filtering can be first applied to the vertical edges in a picture and then the deblocking filtering can be applied to the horizontal edges in the picture.

FIG. 3 shows the method of applying the deblocking filtering in rough steps such as the block boundary deriving step (S310), the bS deriving step (S320), and the filtering application step (S330), but the above-mentioned details from the bS decision to the filtering application can be divided into detailed steps.

For example, the following steps can be performed for the horizontal deblocking filtering on the vertical edges in a picture: (1) deciding the bS of a vertical edge in a coding block (which may be an LCU), wherein the bS decision target edge may be an edge of the smaller block of TU and PU, may be an edge of a predetermined unit block (for example, 8×8 pixel block), or may be an edge of the large block of the smaller unit block of TU and PU and the predetermined unit block; (2) determining ON/OFF of the deblocking filtering at the block level for an edge of which the bS is larger than 0, wherein predetermined sample rows (for example, the second sample row and the fifth sample row) in the blocks on both sides of the boundary (edge) can be used for this compose as described above; (3) determining which of the strong filtering and the weak filtering should be applied to a region in which the filtering is turned on; (4) determining ON/OFF of additional filtering when the weak filtering is applied, wherein the ON/OFF of additional filtering includes determining ON/OFF of filtering for each specific sample as described above; and (5) repeatedly performing the above-mentioned steps on a next coding block (including LCU) in the current picture, wherein the deblocking filtering process is performed on all the vertical edges in the picture.

For example, the following steps can be performed for the vertical deblocking filtering on the horizontal edges in a picture: (1) deciding the bS of a horizontal edge in a coding block (which may be an LCU), wherein the bS decision target edge may be an edge of the smaller block of TU and PU, may be an edge of a predetermined unit block (for example, 8×8 pixel block), or may be an edge of the large block of the smaller unit block of TU and PU and the predetermined unit block; (2) determining ON/OFF of the deblocking filtering at the block level for an edge of which the bS is larger than 0, wherein predetermined sample columns (for example, the second sample column and the fifth sample column) in the blocks on both sides of the boundary (edge) can be used for this purpose as described above; (3) determining which of the strong filtering and the weak filtering should be applied to a region in which the filtering is turned on; (4) determining ON/OFF of additional filtering when the weak filtering is applied, wherein the ON/OFF of additional filtering includes determining ON/OFF of filtering for each specific sample as described above; and (5) repeatedly performing the above-mentioned steps on a next coding block (including LCU) in the current picture, wherein the deblocking filtering process is performed on all the horizontal edges in the picture.

Figure 4:
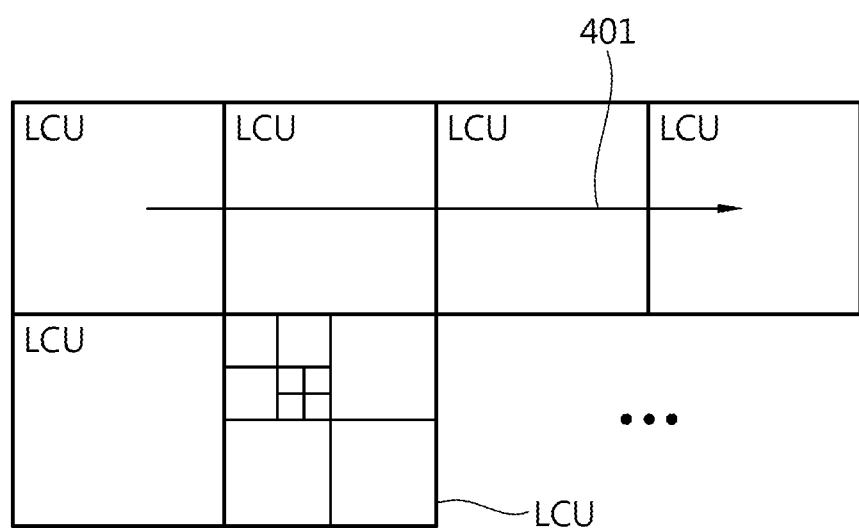
FIG. 4 is a diagram schematically illustrating details of deblocking filtering according to the invention.

FIG. 4 is a diagram schematically illustrating details of the deblocking filtering according to the invention. Referring to FIG. 4, the deblocking filtering (401) is performed on the edges in the cording block in the unit of coding blocks (for example, LCU). As described above, the deblocking filtering (horizontal filtering) for the vertical edges is performed on the whole current picture and then the deblocking filtering (vertical filtering) for the horizontal edges is performed on the whole current picture.

Figure 5:
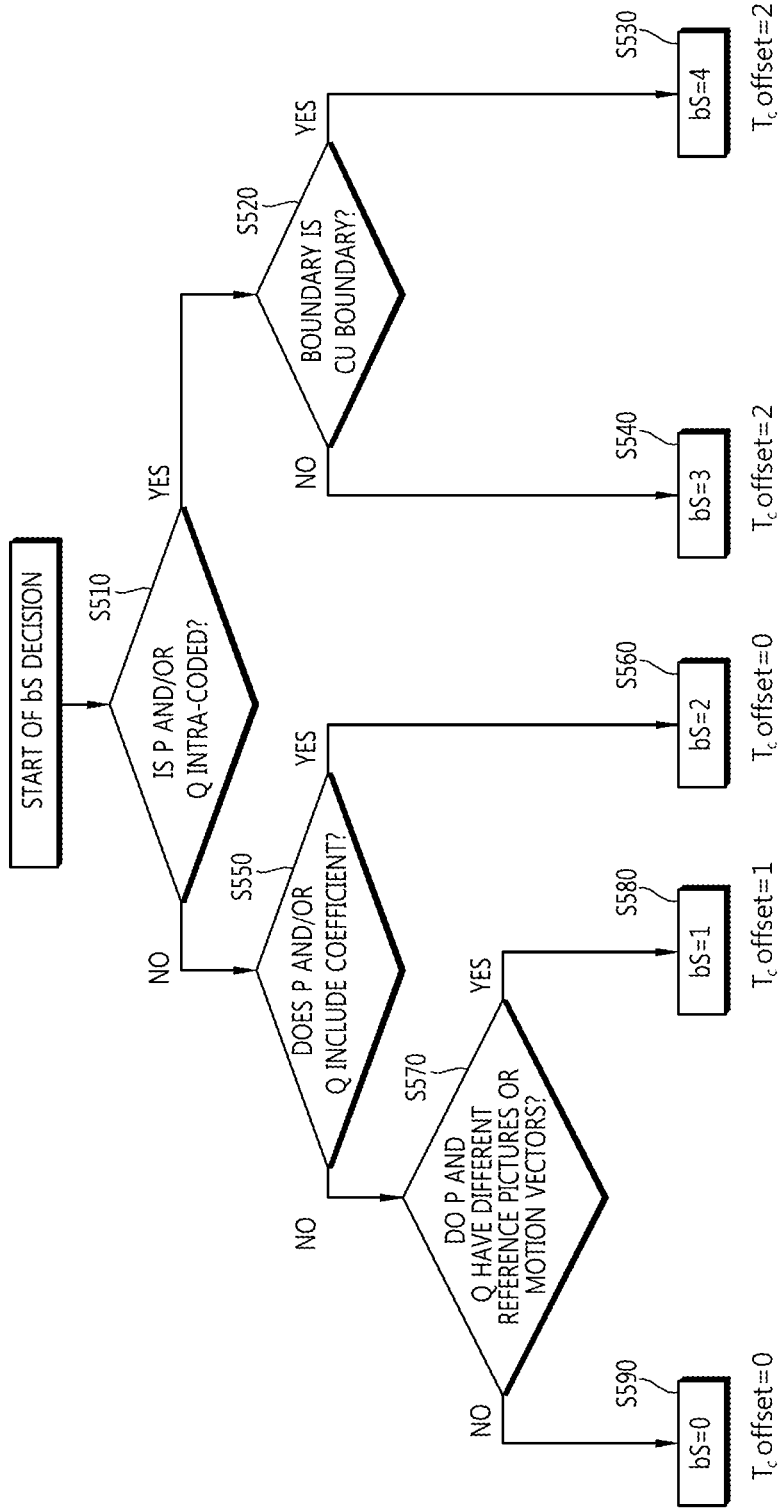
FIG. 5 is a flowchart illustrating schematically illustrating an example of a bS decision method.

FIG. 5 is a flowchart schematically illustrating an example of the bS calculating method.

For the purpose of convenience for explanation, in this description, the current block in the deblocking filtering is represented by Q, and a block adjacent to the current block and earlier encoded/decoded than the current block is represented by P. For example, when the deblocking filtering is performed on a vertical edge, the left block of the vertical edge is represented by P and the right block thereof is represented by Q. When the deblocking filtering is performed on a horizontal edge, the top block of the horizontal edge is represented by P and the bottom block thereof is represented by Q.

Referring to FIG. 5, in order to determine the bS, it is determined whether P and/or Q is intra-coded (S510).

When P and/or Q is intra-coded, it is determined whether the boundary between P and Q is a boundary of a CU (S520). At this time, the boundary of a CU may be a boundary of an LCU.

When it is determined in step S520 that the boundary between P and Q is the boundary of a CU, the bS value of the boundary between P and Q is determined to be 4 (S530).

When it is determined in step S520 that the boundary between P and Q is not the boundary of a CU, the bS value of the boundary between P and Q is determined to be 3 (S540).

When P and/or Q is not intra-coded, it is determined whether P and/or Q includes a coefficient (transform coefficient) other than 0 (S550). At this time, the filter module can determine whether a transform coefficient other than 0 is present on the basis of the transform coefficient which has not been dequantized. The filter module may determine whether a transform coefficient other than 0 is present on the basis of the transform coefficient which has been dequantized.

When it is determined in step S550 that P and/or Q includes a coefficient (transform coefficient other than 0), the bS value of the boundary between P and Q is determined to be 2 (S560).

When it is determined in step S550 that P and/or Q does not include a coefficient (transform coefficient other than 0), it is determined whether P and Q have different reference pictures or different motion vectors (S570).

When it is determined in step S570 that P and Q have different reference pictures or different motion vectors, the bS value of the boundary between P and Q is determined to be 1 (S580).

Otherwise, that is, when the deblocking filtering should not be performed, the bS value of the boundary between P and Q is set to 0 (S590). In FIG. 5, a case where the above-mentioned conditions are not satisfied at all is shown as an example where the bS is not applied.

On the other hand, the values of coefficients necessary for the deblocking filtering may be set depending on the bS values.

The parameter $T_C$offset shown in FIG. 5 can be mentioned as an example. $T_C$offset is a parameter set by a user so as to determine the values of $T_C$ optimized for image characteristics. $T_C$ is one of threshold values used to determine a parameter associated with the deblocking filtering by quantifying blocking artifacts corresponding to the degree of quantization.

FIG. 5 illustrates an example where $T_C$offset is set to 0 when the bS value is 0, 1, or 2 and is set to 2 when the bS value is 3 or 4.

On the other hand, in order to effectively apply the deblocking filtering, the unit block and the decision method for deciding the bS value, which have been described with reference to FIGS. 3 and 5, may be modified and applied.

The bS values can be determined by units equal to or smaller than the actual deblocking filtering unit block.

For example, when the actual deblocking filtering is performed on luma samples in the unit of 8×8 pixels, the bS values can be determined in the unit of 4×4 pixels. In this way, when the size of the deblocking filtering unit block is larger than the size of the bS decision unit block, the bS values of only the boundaries corresponding to the boundaries (edges) of the deblocking filtering unit block out of the boundaries (edges) of the bS decision unit blocks can be determined. In other words, when the bS is determined by L×L pixel blocks (where L is an integer), the bS values of the boundaries of the deblocking filtering unit block are determined in the unit of L pixels.

Specifically, the block unit in which the bS is determined is a 4×4 pixel block and the actual deblocking filtering is performed in the unit of 8×8 pixel blocks. That is, the bS value is determined in the unit of 4 pixels for the boundary of the 8×8 pixel block which is the deblocking filtering unit block Therefore, the bS values of the edges of 4×4 pixel blocks in the 8×8 pixel block which is a deblocking filtering unit block do not have to be determined.

Figure 6:
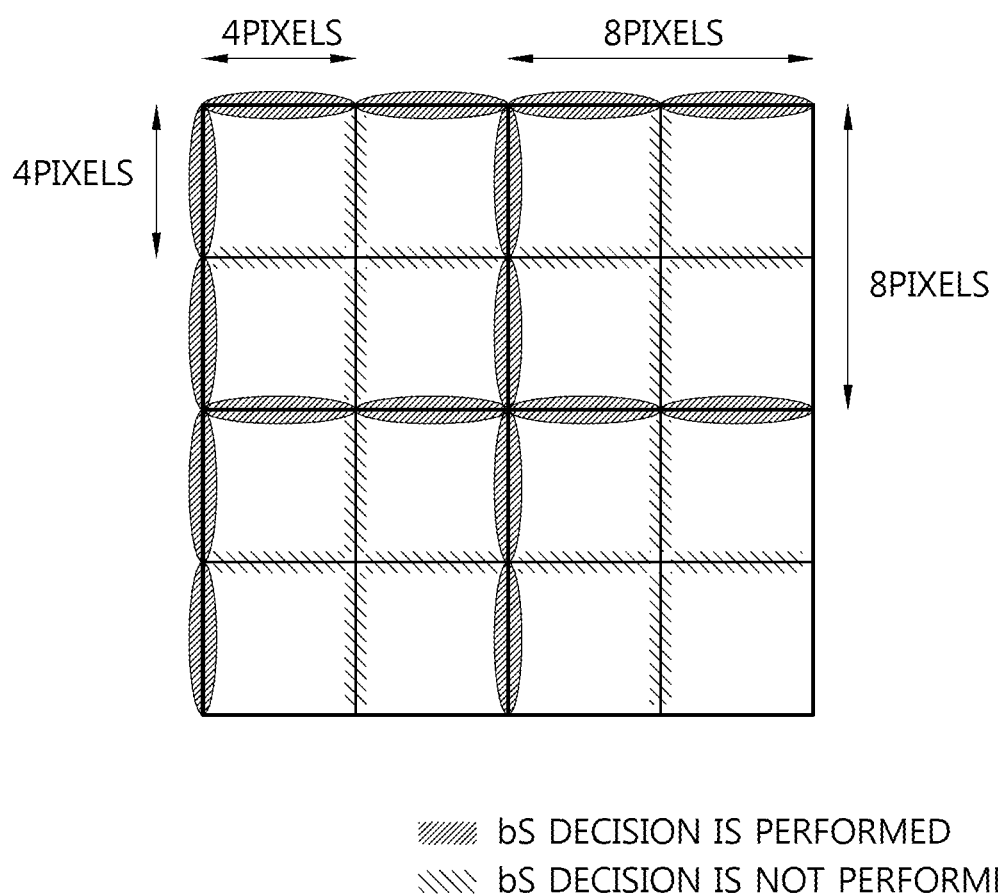
FIG. 6 is a diagram illustrating a target boundary of deblocking filtering when a deblocking filter unit block is a 8×8 pixel block and a bS setting unit block is a 4×4 pixel block.

FIG. 6 is a diagram illustrating a target boundary for the deblocking filtering when a deblocking filtering unit block is an 8×8 pixel block and the bS decision unit block is a 4×4 pixel block.

As shown in the drawing, the bS values of the boundaries located inside the deblocking filtering unit block out of the boundaries of the bS decision unit block may not be determined.

In order to simplify the bS decision process and to reduce complexity, a representative bS value of edges of the deblocking filtering unit block may be determined.

Figure 7:
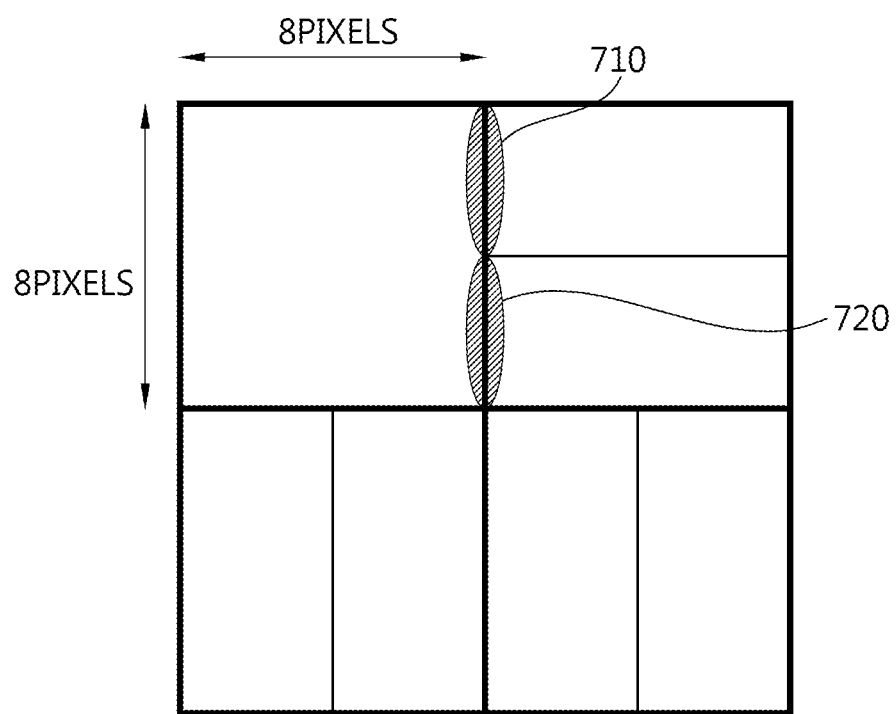
FIG. 7 is a diagram schematically illustrating an example of a method of deciding a representative bS value in a unit block on which deblocking filtering is performed.

FIG. 7 is a diagram schematically illustrating an example of a method of deciding a representative bS value of a deblocking filtering unit block FIG. 7 shows an example where a deblocking filtering unit block 700 is an 8×8 pixel block and a bS decision unit block is a 4×4 pixel block.

Referring to FIG. 7, the vertical edges and the horizontal edges which are the boundaries of the deblocking filtering unit block 700 are present as the boundaries (edges) of the 4×4 pixel block which is the bS decision unit block in the deblocking filtering unit block 700.

The vertical edge will be described as an example. Two vertical edges 710 and 720 of which the bS should be determined are present in the deblocking filtering unit block 700. In the example shown in FIG. 7, the larger bS value of the bS value of the first vertical edge 710 and the bS value of the second vertical edge 720 is determined as the representative bS value of the vertical edges of the deblocking filtering unit block 700.

For example, when the bS value of the first vertical edge 710 is 1 and the bS value of the second vertical edge 720 is 2, 2 which is the base value of the second vertical edge 720 can be determined to be the representative bS value of the vertical edges which are the left boundaries of the deblocking filtering unit block 700.

In FIG. 7, the vertical edges are described as an example for the purpose of convenience for explanation, but the same method can be applied to the horizontal edges. For example, the bS values of two edges which are the top boundaries of the 4×4 pixel blocks in the deblocking filtering unit block 700 are derived as the top boundary of the deblocking filtering unit block 700, and the larger bS value can be determined to be the representative bS value of the horizontal edges which are the top boundary of the deblocking filtering unit block 700.

When the two bS values are equal in the example shown in FIG. 7, any one of the two bS values can be used as the representative bS value.

In order to simplify the bS decision process to reduce complexity and to enhance the deblocking filtering effect, a method of deriving only the bS value of one edge out of the edges of the deblocking filtering unit block may be considered.

Figure 8:
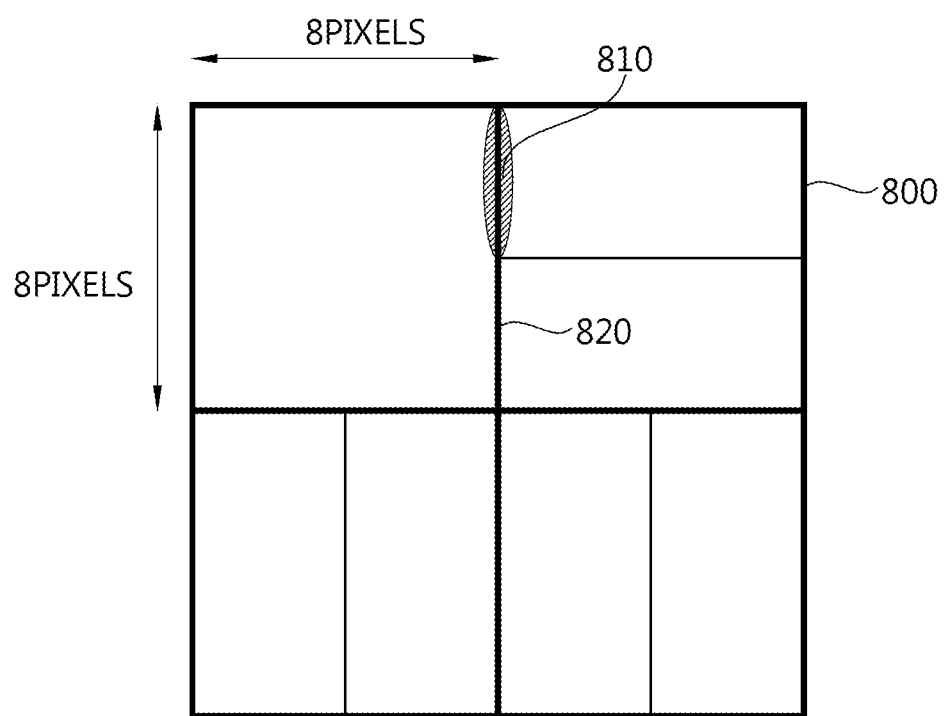
FIG. 8 is a diagram schematically illustrating another example of the method of deciding a representative bS value in a unit block on which deblocking filtering is performed.

FIG. 8 is a diagram schematically illustrating another example of the method of deciding the representative bS value in a deblocking filtering unit block. FIG. 8 shows an example where a deblocking filtering unit block 800 is an 8×8 pixel block and a bS decision unit block is a 4×4 pixel block.

Referring to FIG. 8, unlike the example shown in FIG. 7, the bS value of the zeroth edge 810 out of two vertical edges 810 and 820 of which the bS value should be determined in the deblocking filtering unit block 800 is detei lined. In other words, the bS values of only the vertical edge and the horizontal edge of the zeroth bS decision unit block are determined for each deblocking unit block, and the calculated bS value is used as the representative bS value of the corresponding deblocking filtering unit block. For example, when the deblocking filtering unit block is an 8×8 pixel block and the bS decision unit block is a 4×4 pixel block, four bS decision unit blocks are present in the deblocking filtering unit block. The bS values of only the vertical edge and the horizontal edge of the zeroth block (top-left block) can be determined and can be used as the representative bS value of the deblocking filtering unit block.

When the bS values are determined as shown in FIG. 8, the bS decision process can be simplified, the bS values can be determined through a process corresponding to ¼ of the existing process, and the memory capacity for storing the bS values can be reduced by ¼.

On the other hand, in addition to the method of simplifying the bS decision process in consideration of the bS decision unit block, the bS decision process may be simplified in consideration of the bS decision procedure (bS decision tree) shown in FIG. 5. Even when the bS value is finely divided into from 0 to 4 as in the example shown in FIG. 5, the deblocking filtering process may not use the divided bS values. For example, it may be determined whether bS>0 is satisfied, bS>1 is satisfied, or bS>2 is satisfied.

Therefore, the bS decision tree shown in FIG. 5 may be further simplified to perform the deblocking filtering.

Figure 9:
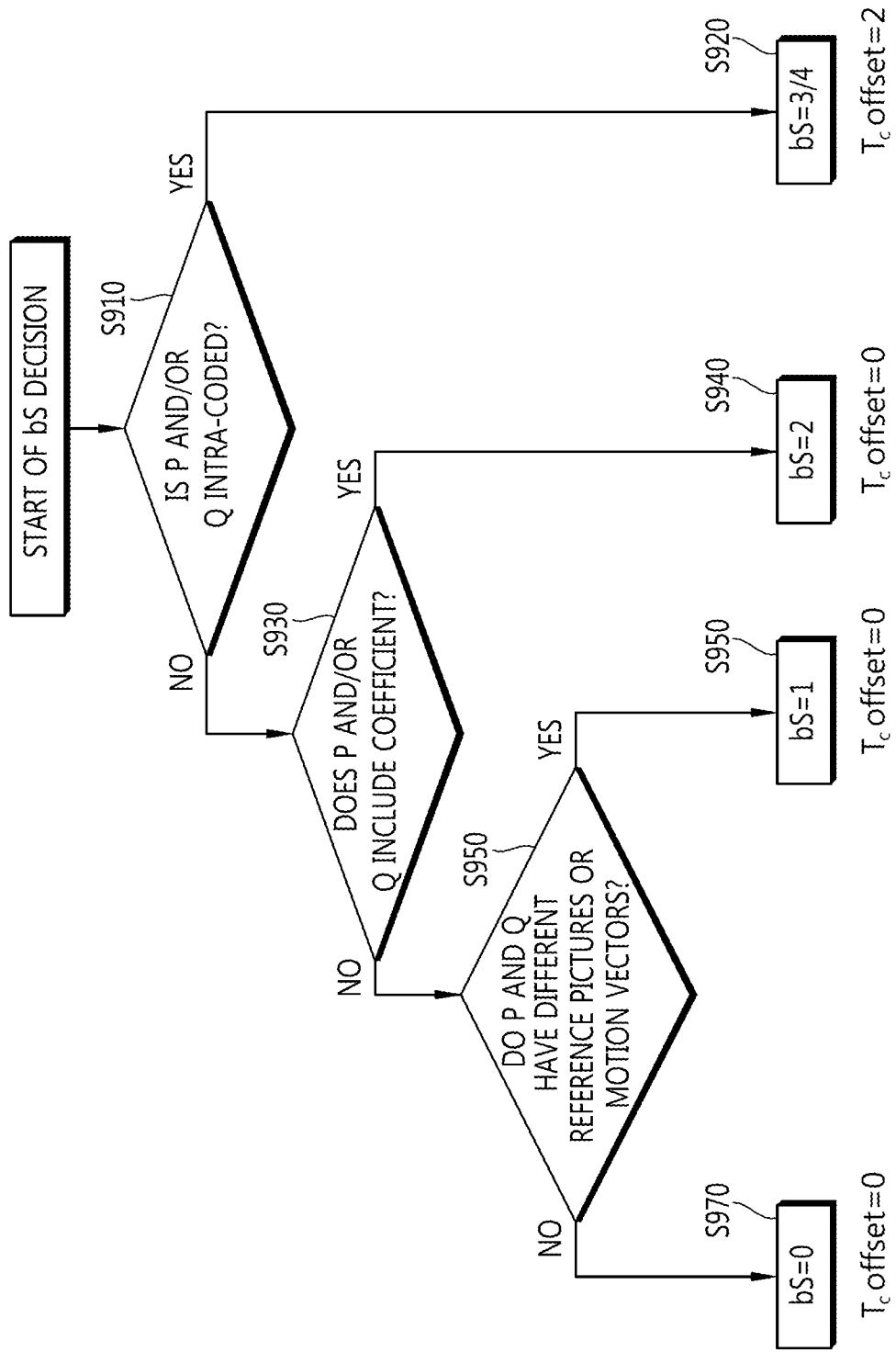
FIG. 9 is a flowchart schematically illustrating another example of the bS decision method.

FIG. 9 is a flowchart schematically illustrating another example of the bS decision method.

Referring to FIG. 9, it is determined whether P and/or Q is intra-coded (S910).

When P and/or Q is intra-coded, it is determined whether the boundary between P and Q is determined to be bS3 (S920).

When it is not the case that P and/or Q is intra-coded, it is determined whether P and/or Q includes a coefficient (transform coefficient other than 0) (S930). At this time, the transform coefficient may be a transform coefficient which has not been dequantized or may be a transform coefficient which has been dequantized.

When it is determined in step S930 that P and/or Q includes a coefficient (transform coefficient other than 0), the bS value of the boundary between P and Q is determined to be bS2 (S940).

When the case determined in step S930 is not the case that P and/or Q includes a coefficient (transform coefficient other than 0), it is determined whether P and Q have different reference pictures or different motion vectors (S950).

When it is determined in step S950 that P and Q have different reference pictures or different motion vectors, the bS value of the boundary between P and Q is determined to be bS1 (S960).

Otherwise, that is, when the deblocking filtering should not be performed, the bS value of the boundary between P and Q is set to bS0 (S970).

Here, the bS values determined in steps S920, S940, S960, and S970 are represented by bS3, bS2, bS1, and bS0, which are intended for the purpose of convenience for explanation. When it is considered that the bS values are classified into four types in the example shown in FIG. 9, the values bS0 to bS3 can be set to bS0=0, bS1=1, bS2=2, and bS3=3/4 (3 and 4) as shown in FIG. 9. In the example shown in FIG. 9, bS3 is determined to be 3/4 (3 and 4) in step S920, which is intended to easily understand that the bS values of 3 and 4 in the example shown in FIG. 5 are determined to be a single value (for example, 3) of bS3 in the example shown in FIG. 9.

The values of a parameter necessary for the deblocking filtering may be set using the bS decision tree. FIG. 9 shows an example where $T_C$offset is set to a specific value (for example, 2) for the largest bS value and is set to 0 for the other bS values.

A method of further reducing the number of decision branches than described in the example of FIG. 9 may be considered. In this case, the number of bS values can be reduced to three (bS0, bS1, and bS2) instead of four (bS0, bS1, bS2, and bS3) as in the FIG. 9 to perform the deblocking filtering.

In this case, the bS value is determined to be the largest bS2 when P and/or Q is intra-coded, the bS value is determined to be bS1 when the deblocking filtering can be applied besides the case of bS2, and the bS value is determined to be bS0 when the deblocking filtering cannot be applied. In consideration of derivation of three bS values, the values of bS0, bS1, and bS2 can be set to bS0=0, bS1=1, and bS2=2.

Figure 10:
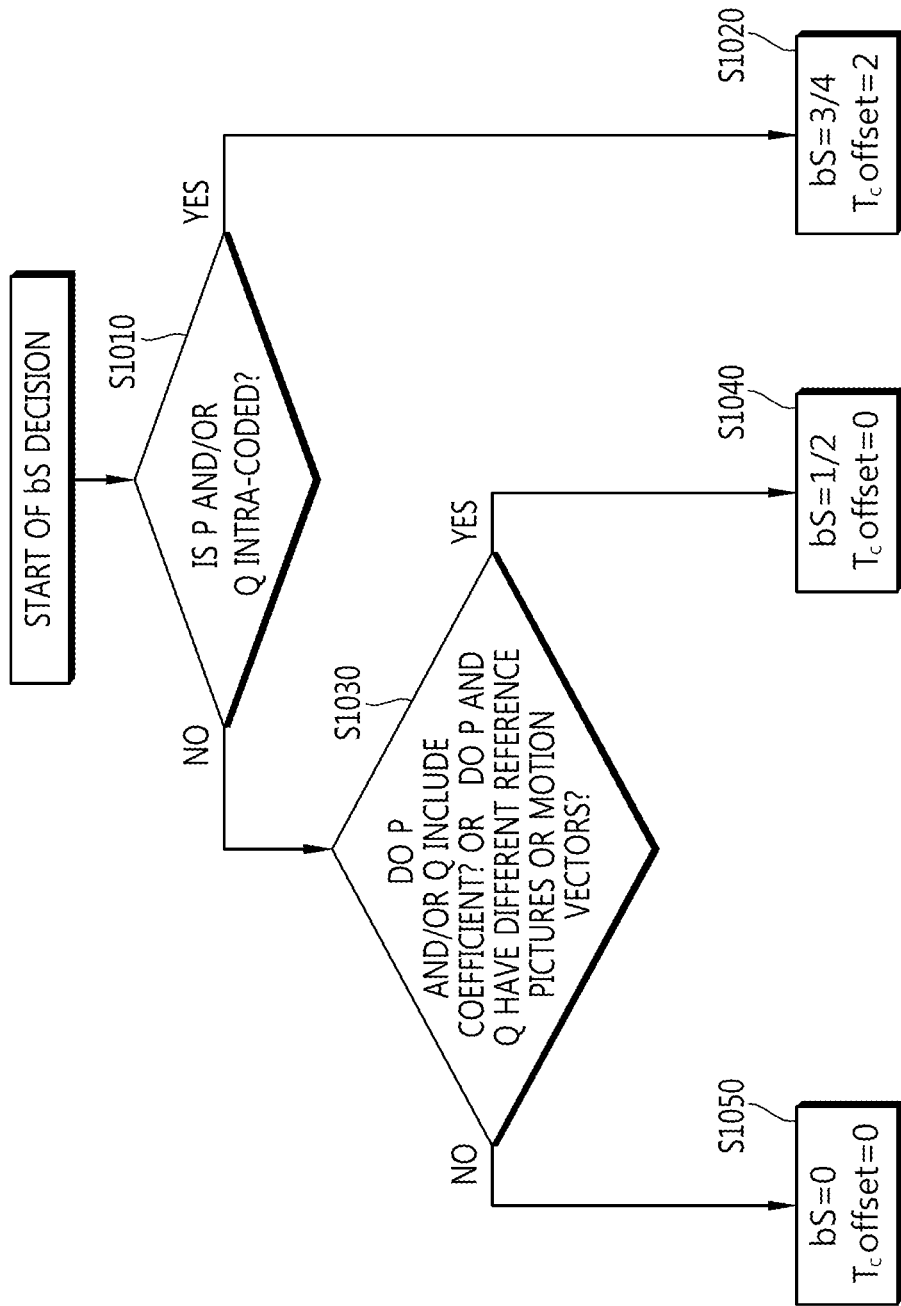
FIG. 10 is a flowchart schematically illustrating another example of the bS decision method.

FIG. 10 is a flowchart schematically illustrating the method of setting the bS value to any one of three values as described above.

Referring to FIG. 10, it is determined whether P and/or Q is intra-coded (S1110).

When P and/or Q is intra-coded, the bS of the boundary between P and Q is determined to be bS2 (S1020). The bS2 corresponds to the case where the bS value is 3 and 4 (bS=3/4) in the example of FIG. 5. Since the largest value of three bS values is bS2, the value bS2 can be set to, for example, 2.

When it is not the case that P and/or Q is intra-coded, it is determined whether P and Q include a coefficient (transform coefficient) other than 0, whether P and Q have different reference pictures, or whether P and Q have different motion vectors, etc. (S1030). At this time, the transform coefficient may be a transform coefficient which has not been dequantized or may be a transform coefficient which has been dequantized.

When it is determined in step S1030 that P and Q include a coefficient (transform coefficient) other than 0, P and Q have different reference pictures, or P and Q have different motion vectors, the bS of the boundary between P and Q is set to bS1 (S1040). The value of bS1 is the bS value when P and Q are not intra-coded and the deblocking filter is applied, and corresponds to the case where the bS value is 1 and 2 (bS=1/2) in the example shown in FIG. 5. Since the middle value of three bS values is bS1, the value of bS1 can be set to, for example, 1.

Otherwise, that is, when the deblocking filtering is not performed, the bS value is set to bS0 (S1050). The value of bS0 is the bS value when the deblocking filter is not applied, and corresponds to the case where the bS value is 0 (bS=0) in the example shown in FIG. 5. Since the smallest value of three bS values is bS0, the value of bS0 can be set to, for example, 0.

The values of a parameter necessary for the deblocking filtering may be set using the bS decision tree. FIG. 10 shows an example where $T_C$offset is set to a specific value (for example, 2) for the largest bS value and is set to 0 for the other bS values.

On the other hand, block-based motion compensation is one principal reason for causing blocking artifacts in a block boundary. In order to overcome this problem, OBMC (Overlapped Block Motion Compensation) can be used.

When the OBMC is used, the above-mentioned bS decision process needs to be modified to be suitable for the OBMC. For example, when motion information varies between blocks, blocking artifacts may increase. Accordingly, similarity of motion information can be said to be one reference for determining 0 and 1 as the bS values. However, when the OBMC technique is used, block artifacts at the boundary of an area on which motion compensation is performed are reduced. As a result, unnecessary deblocking filtering can be reduced, but the bS decision process (bS decision tree) needs to be modified in consideration thereof.

Figure 11:
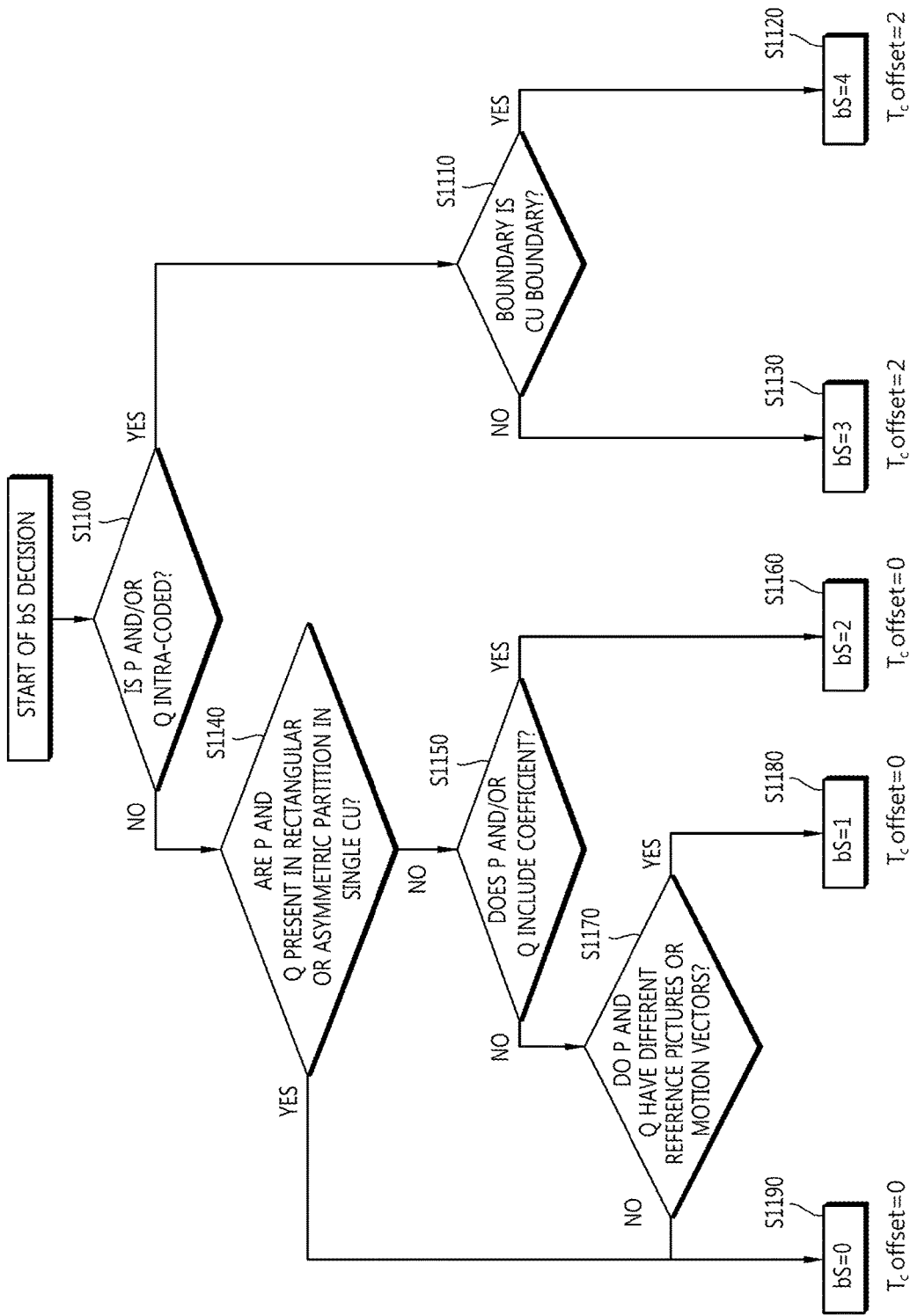
FIG. 11 is a flowchart schematically illustrating the bS decision method as an example of a bS decision tree which is used to applying an OMBC.

FIG. 11 is a flowchart schematically illustrating the bS decision method as an example of the bS decision tree which is applied at the time of application of the OBMC.

Referring to FIG. 11, it is first determined whether P and/or Q is intra-coded (S1100).

When P and/or Q is intra-coded, it is determined whether the boundary of Q, that is, the boundary between P and Q is a boundary of a coding block (S1110). At this time, the coding block includes a CU and an LCU.

When it is determined in step S1110 that the boundary between P and Q is a boundary of a coding block, the bS value of the boundary between P and Q is determined to be bS4 (S1120).

When it is determined in step S1110 that the boundary between P and Q is not a boundary of a coding block, the bS value of the boundary between P and Q is determined to be bS3 (S1130).

When it is determined in step S1100 that P and Q are not intra-coded, it is determined whether P and Q are present inside a rectangular or asymmetric partition in a single coding block (for example CU) (S1140).

When it is determined in step S1140 that P and Q are not present inside a rectangular or asymmetric partition in a single coding block (for example CU), it is determined whether P and/or Q include a coefficient (a transform coefficient other than 0) (S1150). At this time, the transform coefficient may be a transform coefficient which has not been dequantized or may be a transform coefficient which has been dequantized.

When it is determined in step S1150 that P and/or Q include a coefficient (a transform coefficient other than 0), the bS of the boundary between P and Q is determined to be bS2 (S1160).

When it is determined in step S1150 that P and/or Q do not include a coefficient (a transform coefficient other than 0), it is determined whether P and Q have different reference pictures or motion vectors (S1170).

When it is determined in step 1170 that P and Q have different reference pictures or motion vectors, the bS of the boundary between P and Q is determined to be bS1 (S1180).

Otherwise, that is, when the deblocking filtering should not be performed, the bS value is set to bS0 (S1190). The bS is set to bS0 when it is determined in step S1140 that P and Q are not present inside a rectangular or asymmetric partition in a single coding block (for example, CU) or when it is determined in step S1170 that P and Q do not have different reference pictures or motion vectors.

In the example shown in FIG. 11, similarly to the above-mentioned examples of the bS decision method, the relationship of bS4>bS3>bS2>bS1>bS0 is maintained. Therefore, the values of bS0 to bS4 can be set to bS4=4, bS3=3, bS2=2, bS1=1, and bS0=0, as shown in the drawing.

similarly to the above-mentioned examples, the values of a parameter necessary for the deblocking filtering may be set using the bS decision tree. FIG. 11 shows an example where $T_C$offset is set to a specific value (for example, 2) for the largest two bS values and is set to 0 for the other bS values.

In the example shown in FIG. 11, when P and Q are present in a single coding block (for example, a CU) and are present inside a rectangular partition (for example, a prediction block and a PU) or in an asymmetric partition (for example, a prediction block and a PU), the bS value of the boundary between P and Q can be determined to be 0.

Otherwise, when P and Q are present in a single coding block (for example, a CU) and are present inside a rectangular partition (for example, a prediction block and a PU) or in an asymmetric partition (for example, a prediction block and a PU) but there is a large difference between motion information of P and motion information of Q, the bS value of the boundary between P and Q may be determined to be 1. When there is a small difference between the motion information of P and the motion information of Q, the bS value of the boundary between P and Q may be determined to be 0.

Figure 12:
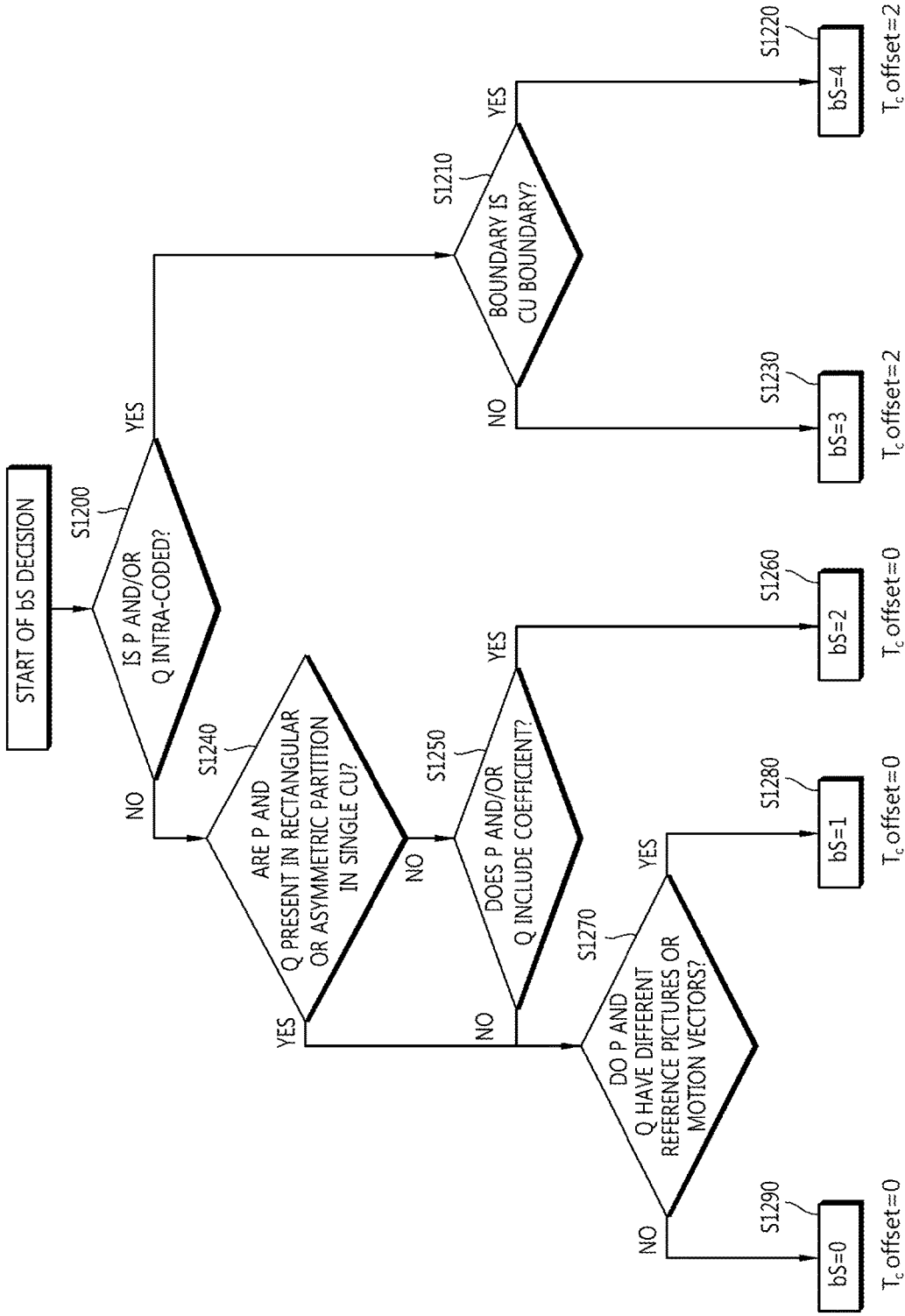
FIG. 12 is a flowchart schematically illustrating the bS decision method as another example of the bS decision tree which is used to applying an OMBC.

FIG. 12 is a flowchart schematically illustrating the bS decision method as another example of the bS decision tree which is applied at the time of application of the OBMC.

Referring to FIG. 12, it is first determined whether P and/or Q is intra-coded (S1200).

When P and/or Q is intra-coded, it is determined whether the boundary of Q, that is, the boundary between P and Q is a boundary of a coding block (S1210). At this time, the coding block includes a CU and an LCU.

When it is determined in step S1210 that the boundary between P and Q is a boundary of a coding block, the bS value of the boundary between P and Q is determined to be bS4 (S1220).

When it is determined in step S1230 that the boundary between P and Q is not a boundary of a coding block, the bS value of the boundary between P and Q is determined to be bS3 (S1230).

When it is determined in step S1200 that P and Q are not intra-coded, it is determined whether P and Q are present in a rectangular or asymmetric partition in a single coding block (for example a CU) (S1240).

When P and Q are not present inside a rectangular or asymmetric partition in a single coding block (for example, CU), it is determined whether P and/or Q include a coefficient (transform coefficient other than 0) (S1250). At this time, the transform coefficient may be a transform coefficient which has not been dequantized or may be a transform coefficient which has been dequantized.

When it is determined in step S1250 that P and/or Q include a coefficient (a transform coefficient other than 0), the bS value of the boundary between P and Q is determined to be bS2 (S1260).

When it is determined in step S1240 that P and Q are present inside a rectangular or asymmetric partition in a single coding block (for example, CU) or when it is determined in step S1250 that P and/or Q do not include a coefficient (a transform coefficient other than 0), it is determined whether P and Q have different reference pictures or motion vectors (S1270).

When it is determined in step S1270 that P and Q have different reference pictures or motion vectors, the bS value of the boundary between P and Q is determined to be bS1 (S1280).

Otherwise, that is, when the deblocking filtering should not be performed, the bS value is set to bS0 (S1290).

In the example shown in FIG. 12, similarly to the above-mentioned examples of the bS decision method, the relationship of bS4>bS3>bS2>bS1>bS0 is maintained. Therefore, the values of bS0 to bS4 can be set to bS4=4, bS3=3, bS2=2, bS1=1, and bS0=0, as shown in the drawing.

As described above, in the example shown in FIG. 12, even when P and Q are present in a single coding block (for example, a CU) and are present inside a rectangular partition (for example, a prediction block and a PU) or in an asymmetric partition (for example, a prediction block and a PU), the bS value of the boundary between P and Q can be determined to be bS1 (for example, bS1=1).

Similarly to the above-mentioned examples, the values of a parameter necessary for the deblocking filtering may be set using the bS decision tree. FIG. 12 shows an example where $T_C$offset is set to a specific value (for example, 2) for the largest two bS values and is set to 0 for the other bS values.

On the other hand, when P and/or Q is intra-coded, the bS values may not have to be divided. For example, as in the example shown in FIG. 5, 11, or 12, it is assumed that it is determined whether a target boundary in an I slice (intra-coded slice) is a boundary of a coding block (for example, a CU), the bS value is determined to be 4 when the determination result is affirmative, and the bS value is determined to be 3 when the determination result is negative. In this case, the bS values in all the I slices are 3 or 4.

In this regard, when the method of modifying the bS decision tree to reduce complexity is applied as shown in FIG. 10, the bS value may be simply applied depending on whether the bS value is larger than 0 or larger than 1 or 2. Therefore, the bS value of 3 or 4 may not have to be distinguished.

Figure 13:
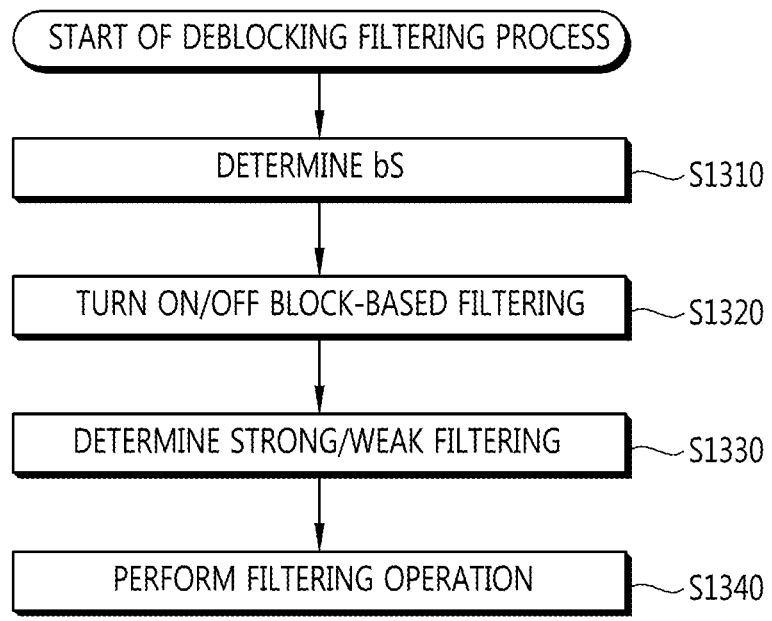
FIG. 13 is a diagram schematically illustrating an example of a method of deciding a bS and applying deblocking filtering.

FIG. 13 is a diagram schematically illustrating an example of the method of deciding a bS value to apply the deblocking filtering.

Retelling to FIG. 13, the bS value is determined to apply the deblocking filtering (S1310), ON/OFF of block-based filtering is determined on the basis of the determined bS value (S1320), it is determined whether a strong filter or a weak filter should be applied to a predetermined bS value (S1330), and the filtering operation is then performed on the basis thereof (S1340).

In the example shown in FIG. 13, the method of applying the deblocking filter is identical or similar to the method described with reference to FIG. 3.

In the bS decision step (S1310), as shown in FIG. 5, 11, or 12, when the P and/or Q is intra-coded, the bS value may be determined by determining whether the target boundary is a boundary of a coding block.

Figure 14:
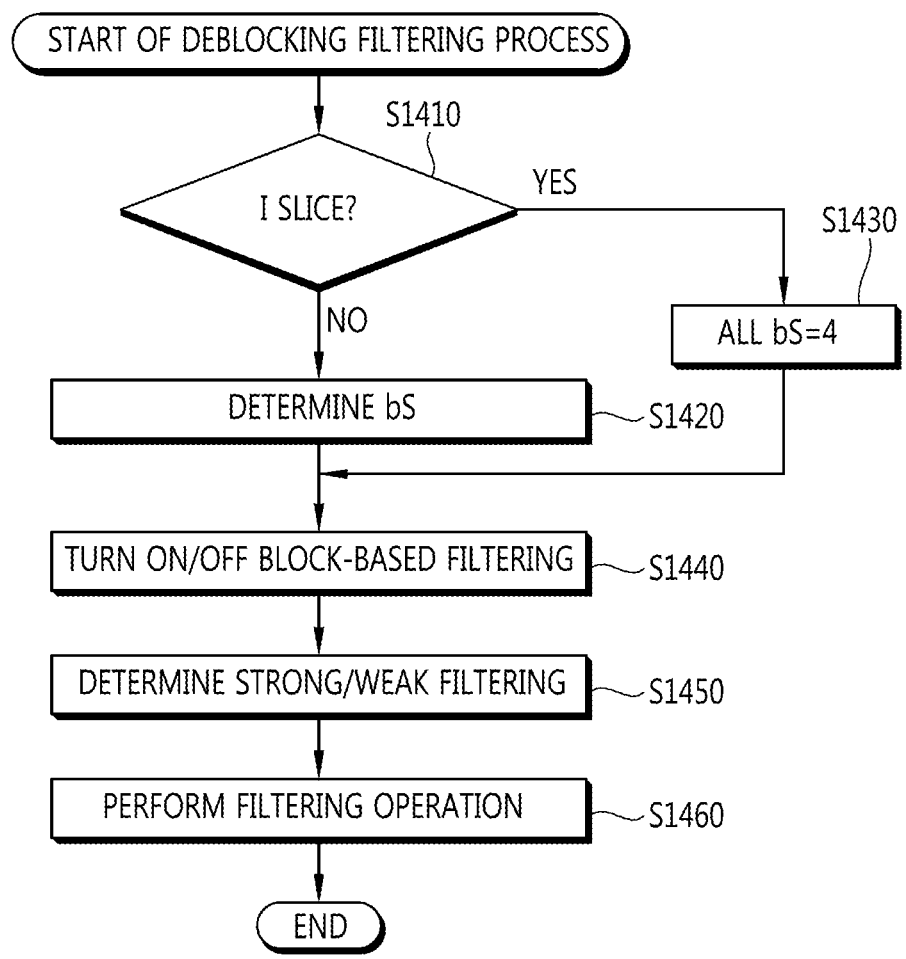
FIG. 14 is a diagram schematically illustrating another example of a method of deciding a bS and applying deblocking filtering.

FIG. 14 is a diagram schematically illustrating another example of the method of deciding a bS value to apply the deblocking filtering. In FIG. 14, unlike the example shown in FIG. 13, when P and/or Q is intra-coded (I slice), the bS value is not additionally distinguished and determined.

Referring to FIG. 14, it is determined whether P and/or Q is intra-coded (I slice) in order to apply the deblocking filtering (S1410).

When P and/or Q is not intra-coded, the general bS decision step as shown in FIG. 13 is performed (S1420).

When P and/or Q is intra-coded (I slice), the bS value is determined to be a single value (for example, 4) unlike the example shown in FIG. 13 (S1430).

Subsequently, ON/OFF of block-based filtering is determined on the basis of the determined bS value (S1440), it is determined whether a strong filter or a weak filter should be applied to a predetermined bS value (S1450), and the filtering operation is then performed on the basis thereof (S1460).

In addition to the example shown in FIG. 14, the method using a representative bS value described in the example shown in FIG. 7 may be modified to perform the deblocking filtering, as another method of modifying a applying the above-mentioned deblocking filtering method.

In the example shown in FIG. 7, when the deblocking filtering is performed by 8×8 pixel blocks, the larger bS value of two bS values determined in the unit of 4×4 pixel blocks is used as a representative bS value.

Figure 15:
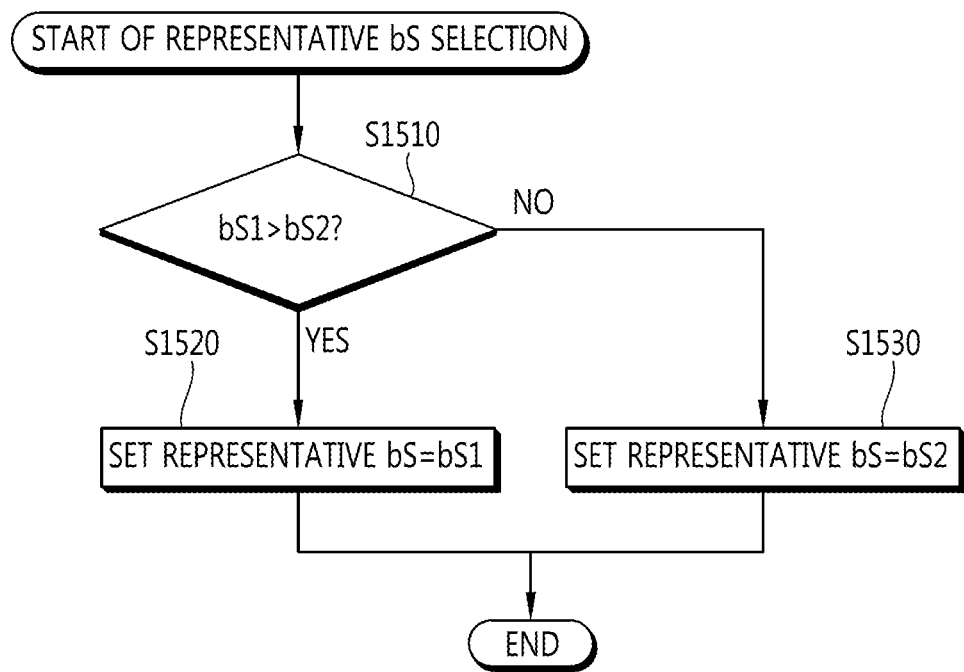
FIGS. 15 and 16 are flowcharts schematically illustrating examples of a method of deciding a representative bS.

FIG. 15 is a flowchart schematically illustrating an example of the method of deciding a representative bS value.

Referring to FIG. 15, the magnitudes of bS1 and bS2 in a deblocking filtering unit block are compared to select the representative bS value (S1510).

When it is determined in step S1510 that bS1 is larger than bS2, the representative bS value is set to bS1 (S1520). On the other hand, when it is determined in step S1510 that bS2 is larger than bS1, the representative bS value is set to bS2 (S1530).

Here, bS1 and bS2 may be bS values of two vertical edges in the deblocking filtering unit block or may be bS values of two horizontal edges. The method shown in FIG. 15 may be performed in the deblocking filtering process on the vertical edges to determine the representative bS value of the vertical edges and then may be performed in the deblocking filtering process on the horizontal edges to determine the representative bS value of the horizontal edges.

The filter module can perform the deblocking filtering using the determined representative bS value.

The example shown in FIG. 15 shows that the larger bS value is used as the representative bS value as in the example shown in FIG. 7. Otherwise, the method of deciding a representative bS value may be changed to reduce excessive deblocking filtering and to reduce a computational load.

Figure 16:
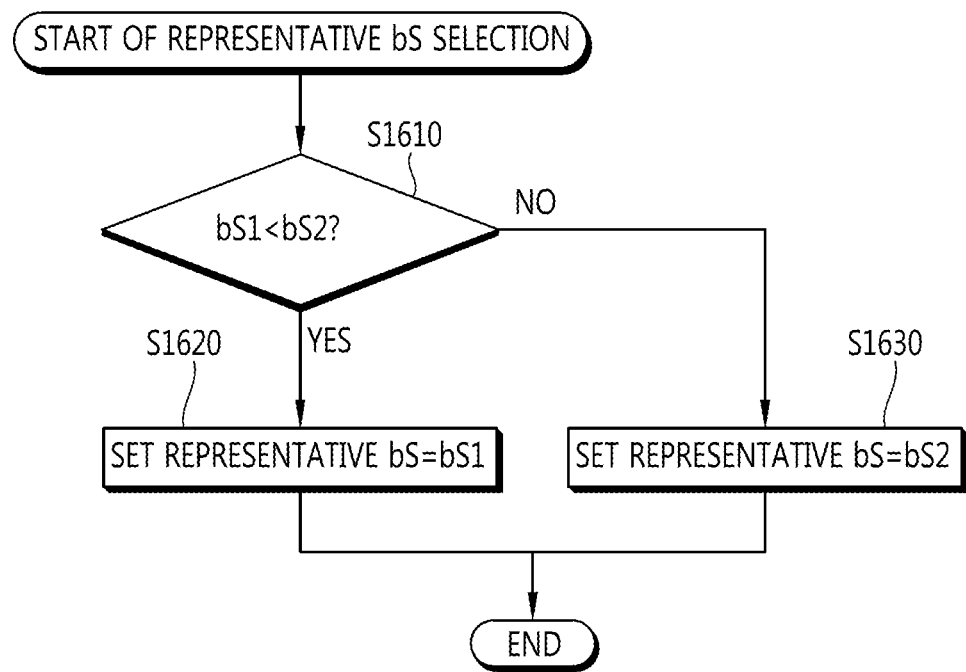

FIG. 16 is a flowchart schematically illustrating another example of the method of deciding a representative bS value.

Referring to FIG. 16, the magnitudes of bS1 and bS2 in a deblocking filtering unit block are compared to select the representative bS value (S1610).

When it is determined in step S1610 that bS1 is smaller than bS2, the representative bS value is set to bS1 (S1620). On the other hand, when it is determined in step S1610 that bS2 is smaller than bS1, the representative bS value is set to bS2 (S1630).

Here, bS1 and bS2 may be bS values of two vertical edges in the deblocking filtering unit block or may be bS values of two horizontal edges. The method shown in FIG. 16 may also be performed in the deblocking filtering process on the vertical edges to determine the representative bS value of the vertical edges and then may be performed in the deblocking filtering process on the horizontal edges to determine the representative bS value of the horizontal edges.

The filter module can perform the deblocking filtering using the determined representative bS value.

Figure 17:
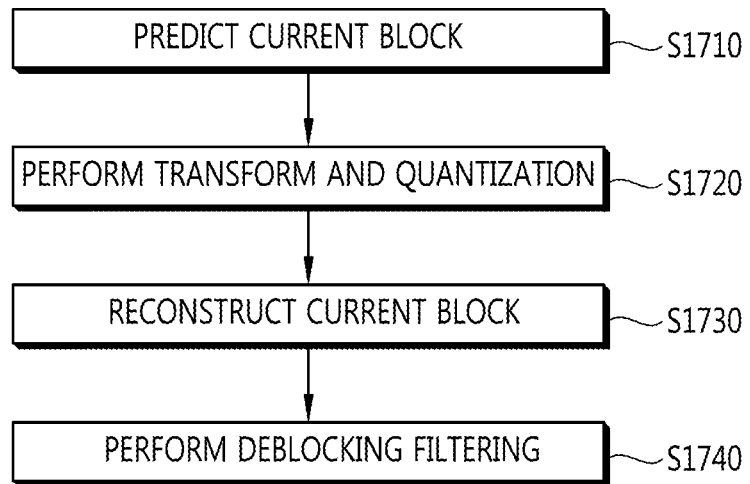
FIG. 17 is a flowchart schematically illustrating a video encoding method according to the invention.

FIG. 17 is a flowchart schematically illustrating a video encoding method according to the invention.

Referring to FIG. 17, in the encoding method, an encoder divides an input picture and perform a prediction operation on a current block (S1710). The prediction operation on the current block can be performed by a prediction module of the encoder. The prediction module may perform an intra prediction or an inter prediction on the current block. In consideration of RDO (Rate Distortion Optimization) or the like, it can be determined which of the intra prediction and the inter prediction should be performed.

When a skip mode is not applied, the prediction module generates a prediction signal and generates a residual signal which is a difference between an original signal and the prediction signal.

The encoder transforms and quantizes the residual signal (S1720). The transform of the residual signal can be performed by a transform module and the quantization of the transformed signal (for example, transform coefficients) can be performed by a quantization module.

The transformed and quantized signal is transmitted after undergoing an entropy encoding process.

The encoder dequantizes and inversely transforms the transformed and quantized signal to reconstruct the current block (S1730). The dequantized and inversely-transformed signal is added to the residual signal to reconstruct the original signal.

The encoder can apply the deblocking filtering on the reconstructed signal (S1740). The reconstructed signal can be reconstructed to a signal closer to the original signal by the deblocking filtering. The deblocking filtering can be performed by the filter module. The filter module may apply the SAO (Sample Adaptive Offset) after applying the deblocking filter.

The specific details of the deblocking filtering are the same as described above with reference to the accompanying drawings.

The signal to which the deblocking filtering has been applied may be stored in a method such as a DPB (Decoded Picture Buffer) and may be referred to for predicting other blocks or other pictures.

It has been described herein that a residula signal is generated by prediction and is transmitted, but the residual signal is not generated/transmitted when the skip mode is applied.

Figure 18:
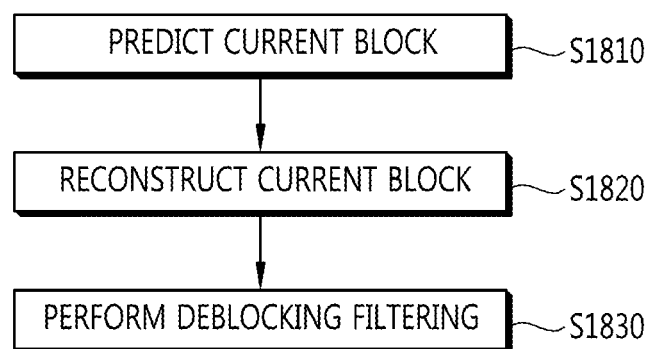
FIG. 18 is a flowchart schematically illustrating a video decoding method according to the invention.

FIG. 18 is a flowchart schematically illustrating a video decoding method according to the invention.

Referring to FIG. 18, a decoder performs an entropy decoding operation on a received bitstream and performs a prediction operation on a current block (S1810). The prediction process on the current block can be performed by a prediction module of the decoder. The prediction module performs an inter prediction or an intra prediction on the current block on the basis of information signaled from the encoder. The prediction module generates a prediction signal (prediction block) of the current block through the prediction.

The decoder reconstructs the current block on the basis of the prediction of the current block (S1820). The decoder generates a residual signal (residual block) from the bitstream received from the encoder through the use of dequantization/inverse transform and adds the prediction signal (prediction block) and the residual signal (residual block) to reconstruct a reconstructed signal (reconstructed block). When the skip mode is applied, the residual signal is not transmitted and the prediction signal can be used as the reconstructed signal.

The decoder performs the deblocking filtering on the reconstructed signal (reconstructed block) (S1830). The deblocking filtering can be performed by a filter module of the decoder. The filter module applies the deblocking filter of the reconstructed block to modify the reconstructed block to be closer to the original block.

The specific details of the deblocking filtering are the same as described above with reference to the accompanying drawings.

The filter module may apply the SAO (Sample Adaptive Offset) to the reconstructed block on the basis of information received from the encoder after applying the deblocking filter.

The signal reconstructed by the filter module may be stored in a method such as a DPB (Decoded Picture Buffer) and may be referred to for predicting other blocks or other pictures or may be output as a reconstructed image.

It should be noted that FIGS. 17 and 18 are provided to schematically illustrate the application of the deblocking filtering according to the invention to the encoding/decoding processes, for the purpose of easy understanding of the invention, and the encoding/decoding processes described in detail with reference to the accompanying drawings can be performed together therewith.

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments can include various examples. Therefore, the invention includes all substitutions, corrections, and modifications belonging to the appended claims.

When it is mentioned above that an element is "connected to" or "coupled to" another element, it should be understood that still another element may be interposed therebetween, as well as that the element may be connected or coupled directly to another element. On the contrary, when it is mentioned that an element is "connected directly to" or "coupled directly to" another element, it should be understood that still another element is not interposed therebetween.

The invention claimed is:

1. A deblocking filtering method performed by a decoding apparatus, the method comprising:
    deriving a reconstructed picture based on information obtained from a bitstream; and
    applying a deblocking filtering process on the reconstructed picture,
    wherein applying the deblocking filtering process includes:
    setting a boundary strength (bS) value on a target boundary in the reconstructed picture, wherein the bS value is set from three case values, and
    applying deblocking filtering on the target boundary based on the bS value,
    wherein the bS value is set for the target boundary which is an overlapped boundary of a boundary of a bS setting unit and a boundary of a deblocking filtering unit,
    wherein the deblocking filtering unit is an array of 8×8 samples and the bS setting unit is an array of 4×4 samples.

2. The method of claim 1, wherein applying the deblocking filtering on the target boundary includes:
    determining whether the deblocking filtering is not to be applied on the target boundary based on the bS value, wherein the deblocking filtering is not applied on the target boundary when the bS value is set equal to 0;
    determining based on specific samples neighboring the target boundary and located in specific sample rows or columns, whether the deblocking filtering is not to be applied on the target boundary when the set bS value is larger than 0, wherein even when the bS value is larger than 0 when it is determined that the deblocking filtering is not to be applied on the target boundary, the deblocking filtering is not applied on the target boundary;
    determining whether strong filtering is to be applied or weak filtering is to be applied when the deblocking filtering is determined to be applied; and
    applying a strong filtering or a weak filtering on the target boundary according to the determination on whether strong filtering is to be applied or weak filtering is to be applied,
    wherein the specific samples in k-th sample row and (k+3)-th sample row are used for determining whether the deblocking filtering is not to be applied on the target boundary when the target boundary is a vertical boundary or the specific samples in k-th sample column and (k+3)-th sample column are used for determining whether the deblocking filtering is not to be applied on the target boundary when the target boundary is a horizontal boundary, wherein k is an integer and 0≤k.

3. The method of claim 2, wherein the applying the deblocking filtering further includes determining additionally whether the deblocking filtering is applied when the weak filtering is determined to be applied.

4. The method of claim 2, wherein the applying the deblocking filtering further includes determining whether the weak filtering is to be applied on specific samples when the weak filtering is determined to be applied.

5. The method of claim 2, wherein when the bS value is larger than 0 and the target boundary is the vertical boundary, whether the deblocking filtering is not to be applied is determined based on a first sum of a difference between the first sample and the second sample from the vertical boundary and a difference between the third sample and the second sample from the vertical boundary among samples in the k-th sample row, and a second sum of a difference between the first sample and the second sample from the vertical boundary and a difference between the third sample and the second sample from the vertical boundary among samples in the (k+3)-th sample row,
wherein when a sum of the first sum and the second sum is greater than a threshold value it is determined that the deblocking filtering is not to be applied for the target boundary.

6. The method of claim 2, wherein when the bS value is larger than 0 and the target boundary is the horizontal boundary, whether the deblocking filtering is not to be applied is determined based on a first sum of a difference between the first sample and the second sample from the horizontal boundary and a difference between the third sample and the second sample from the horizontal boundary among the samples in the k-th sample column, and a second sum of a difference between the first sample and the second sample from the horizontal boundary and a difference between the third sample and the second sample from the horizontal boundary among samples in the (k+3)-th sample column,
wherein when a sum of the first sum and the second sum is greater than a threshold value it is determined that the deblocking filtering is not to be applied for the target boundary.

7. The method of claim 1, wherein if one of two blocks facing each other across the target boundary includes a non-zero transform coefficient, the bS value is set equal to 1, and if different reference pictures are used for the inter prediction of the two blocks, the bS value is set equal to 1.

8. The method of claim 1, wherein in the applying the deblocking filtering, the deblocking filtering on reconstructed samples neighboring vertical boundaries are performed and then the deblocking filtering on reconstructed samples neighboring horizontal boundaries are performed.

9. The method of claim 1, wherein the applying the deblocking filtering includes determining whether strong filtering is to be applied or weak filtering is to be applied based on samples of two blocks facing each other across the target boundary.

10. The method of claim 9, wherein whether the strong filtering is to be applied or the weak filtering is to be applied is determined based on samples to be subjected to the filtering out of samples in sample rows when the target boundary is the vertical boundary, or based on samples to be subjected to the filtering out of samples in sample columns when the target boundary is the horizontal boundary.

11. A deblocking filtering method performed by an encoding apparatus, the method comprising:
deriving a reconstructed picture of a current picture; and
applying a deblocking filtering process on the reconstructed picture,
wherein applying the deblocking filtering process includes:
setting a boundary strength (bS) value on a target boundary in the reconstructed picture, wherein the bS value is set from three case values, and
applying deblocking filtering on the target boundary based on the bS value,
wherein the bS value is set for the target boundary which is an overlapped boundary of a boundary of a bS setting unit and a boundary of a deblocking filtering unit,
wherein the deblocking filtering unit is an array of 8×8 samples and the bS setting unit is an array of 4×4 samples.

12. The method of claim 11, wherein applying the deblocking filtering on the target boundary includes:
determining whether the deblocking filtering is not to be applied on the target boundary based on the bS value, wherein the deblocking filtering is not applied on the target boundary when the bS value is set equal to 0;
determining based on specific samples neighboring the target boundary and located in specific sample rows or columns, whether the deblocking filtering is not to be applied on the target boundary when the set bS value is larger than 0, wherein even when the bS value is larger than 0 when it is determined that the deblocking filtering is not to be applied on the target boundary, the deblocking filtering is not applied on the target boundary;
determining whether strong filtering is to be applied or weak filtering is to be applied when the deblocking filtering is determined to be applied; and
applying a strong filtering or a weak filtering on the target boundary according to the determination on whether strong filtering is to be applied or weak filtering is to be applied,
wherein the specific samples in k-th sample row and (k+3)-th sample row are used for determining whether the deblocking filtering is not to be applied on the target boundary when the target boundary is a vertical boundary or the specific samples in k-th sample column and (k+3)-th sample column are used for determining whether the deblocking filtering is not to be applied on the target boundary when the target boundary is a horizontal boundary, wherein k is an integer and 0≤k.

13. The method of claim 12, wherein the applying the deblocking filtering further includes determining additionally whether the deblocking filtering is applied when the weak filtering is determined to be applied.

14. The method of claim 12, wherein when the bS value is larger than 0 and the target boundary is the vertical boundary, whether the deblocking filtering is not to be applied is determined based on a first sum of a difference between the first sample and the second sample from the vertical boundary and a difference between the third sample and the second sample from the vertical boundary among samples in the k-th sample row, and a second sum of a difference between the first sample and the second sample from the vertical boundary and a difference between the third sample and the second sample from the vertical boundary among samples in the (k+3)-th sample row, wherein when a sum of the first sum and the second sum is greater than a threshold value it is determined that the deblocking filtering is not to be applied for the target boundary.

15. The method of claim 12, wherein when the bS value is larger than 0 and the target boundary is the horizontal boundary, whether the deblocking filtering is not to be applied is determined based on a first sum of a difference between the first sample and the second sample from the horizontal boundary and a difference between the third sample and the second sample from the horizontal boundary among the samples in the k-th sample column, and a second sum of a difference between the first sample and the second sample from the horizontal boundary and a difference between the third sample and the second sample from the horizontal boundary among samples in the (k+3)-th sample column, wherein when a sum of the first sum and the second sum is greater than a threshold value it is determined that the deblocking filtering is not to be applied for the target boundary.

16. The method of claim 11, wherein if one of two blocks facing each other across the target boundary includes a non-zero transform coefficient, the bS value is set equal to 1, and if different reference pictures are used for the inter prediction of the two blocks, the bS value is set equal to 1.

17. The method of claim 11, wherein in the applying the deblocking filtering, the deblocking filtering on reconstructed samples neighboring vertical boundaries are performed and then the deblocking filtering on reconstructed samples neighboring horizontal boundaries are performed.

18. The method of claim 11, wherein the applying the deblocking filtering includes determining whether strong filtering is to be applied or weak filtering is to be applied based on samples of two blocks facing each other across the target boundary.

19. The method of claim 18, wherein whether the strong filtering is to be applied or the weak filtering is to be applied is determined based on samples to be subjected to the filtering out of samples in sample rows when the target boundary is the vertical boundary, or based on samples to be subjected to the filtering out of samples in sample columns when the target boundary is the horizontal boundary.

20. A non-transitory decoder-readable storage medium storing encoded video information causing a decoding apparatus to execute a deblocking filtering method comprising: deriving a reconstructed picture based on information obtained from a bitstream; and applying a deblocking filtering process on the reconstructed picture, wherein applying the deblocking filtering process includes: setting a boundary strength (bS) value on a target boundary in the reconstructed picture, wherein the bS value is set from three case values, and applying deblocking filtering on the target boundary based on the bS value, wherein the bS value is set for the target boundary which is an overlapped boundary of a boundary of a bS setting unit and a boundary of a deblocking filtering unit, wherein the deblocking filtering unit is an array of 8×8 samples and the bS setting unit is an array of 4×4 samples.

* * * * *